US011924927B2

(12) United States Patent
Pan et al.

(10) Patent No.: US 11,924,927 B2
(45) Date of Patent: Mar. 5, 2024

(54) UU INTERFACE ENHANCEMENT FOR NR V2X

(71) Applicant: InterDigital Patent Holdings, Inc., Wilmington, DE (US)

(72) Inventors: Kyle Jung-Lin Pan, Saint James, NY (US); Fengjun Xi, San Diego, CA (US); Chunxuan Ye, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 33 days.

(21) Appl. No.: 17/316,298

(22) Filed: May 10, 2021

(65) Prior Publication Data
US 2021/0267015 A1  Aug. 26, 2021

Related U.S. Application Data

(63) Continuation of application No. 16/535,576, filed on Aug. 8, 2019, now abandoned.
(Continued)

(51) Int. Cl.
*H04W 92/18* (2009.01)
*H04L 1/00* (2006.01)
(Continued)

(52) U.S. Cl.
CPC .......... *H04W 92/18* (2013.01); *H04L 1/0003* (2013.01); *H04L 1/0061* (2013.01);
(Continued)

(58) Field of Classification Search
CPC ... H04W 92/18; H04W 72/042; H04W 72/14; H04W 76/27; H04W 76/11;
(Continued)

(56) References Cited

U.S. PATENT DOCUMENTS 10,187,180 B2   1/2019 Sorrentino et al.
10,477,620 B2 *  11/2019 Xiong ................... H04W 24/10
(Continued)

FOREIGN PATENT DOCUMENTS

WO   2018/135905   7/2018
WO   2018/149265   8/2018
(Continued)

OTHER PUBLICATIONS

US 10,897,322 B2, 01/2021, Zhou et al. (withdrawn)
(Continued)

*Primary Examiner* — Parth Patel
(74) *Attorney, Agent, or Firm* — Volpe Koenig

(57) ABSTRACT

A method and apparatus for performing sidelink communications in a wireless transmit receive unit (WTRU) using Long Term Evolution (LTE) and New Radio (NR) technologies is described herein. A WTRU receives downlink control information (DCI) on a physical downlink control channel (PDCCH) from a gNodeB (gNB), wherein the DCI is associated with a cyclic redundancy check (CRC). The a determination is made as to whether the DCI is for an LTE or NR technology sidelink transmission. On a condition that the DCI is for NR technology, the WTRU determines which transmit modulation and coding scheme (MCS) table to apply based on the masking of at least some of the bits in the CRC. Then the WTRU transmits sidelink data on resources indicated by the DCI using the determined MCS table. The WTRU may also receive HARQ feedback on resources indicated by the DCI for HARQ feedback.

12 Claims, 16 Drawing Sheets

Related U.S. Application Data

(60) Provisional application No. 62/716,143, filed on Aug. 8, 2018, provisional application No. 62/736,811, filed on Sep. 26, 2018.

(51) Int. Cl.

| | | |
|---|---|---|
| *H04L 1/1812* | (2023.01) | |
| *H04W 4/40* | (2018.01) | |
| *H04W 28/02* | (2009.01) | |
| *H04W 72/23* | (2023.01) | |
| *H04W 76/11* | (2018.01) | |
| *H04W 76/27* | (2018.01) | |

(52) U.S. Cl.
CPC ............ *H04L 1/1819* (2013.01); *H04W 4/40* (2018.02); *H04W 28/0278* (2013.01); *H04W 72/23* (2023.01); *H04W 76/11* (2018.02); *H04W 76/27* (2018.02)

(58) Field of Classification Search
CPC .. H04W 28/0278; H04W 4/40; H04L 1/0061; H04L 1/0003; H04L 1/1819
See application file for complete search history.

(56) References Cited

U.S. PATENT DOCUMENTS

| | | | |
|---|---|---|---|
| 10,749,635 B2* | 8/2020 | Li | H04W 74/0866 |
| 10,750,521 B2* | 8/2020 | Lee | H04W 72/0493 |
| 11,405,911 B2* | 8/2022 | Zhang | H04W 72/042 |
| 2014/0328329 A1 | 11/2014 | Novlan et al. | |
| 2015/0003384 A1* | 1/2015 | Kawasaki | H04B 7/26 370/329 |
| 2015/0195818 A1* | 7/2015 | Davydov | H04L 5/0046 370/329 |
| 2016/0295624 A1* | 10/2016 | Novlan | H04L 67/12 |
| 2017/0134080 A1 | 5/2017 | Rahman et al. | |
| 2017/0150490 A1* | 5/2017 | Chen | H04W 88/06 |
| 2017/0171014 A1* | 6/2017 | Chen | H04L 1/003 |
| 2017/0188391 A1 | 6/2017 | Rajagopal et al. | |
| 2017/0245292 A1* | 8/2017 | Agiwal | H04W 28/02 |
| 2017/0290046 A1* | 10/2017 | Sun | H04L 5/0053 |
| 2017/0311354 A1* | 10/2017 | Lee | H04W 74/0833 |
| 2017/0339689 A1* | 11/2017 | Lee | H04W 36/0061 |
| 2017/0353819 A1* | 12/2017 | Yin | H04W 72/1284 |
| 2018/0070369 A1 | 3/2018 | Papasakellariou | |
| 2018/0123744 A1* | 5/2018 | Nogami | H04L 1/1854 |
| 2018/0132208 A1* | 5/2018 | Pan | H04W 72/0406 |
| 2018/0192383 A1 | 7/2018 | Nam et al. | |
| 2018/0279327 A1* | 9/2018 | Ying | H04W 72/0446 |
| 2018/0368191 A1* | 12/2018 | Vutukuri | H04W 56/00 |
| 2019/0007891 A1* | 1/2019 | Xu | H04W 48/10 |
| 2019/0089498 A1 | 3/2019 | Pelletier et al. | |
| 2019/0097751 A1 | 3/2019 | Li et al. | |
| 2019/0215095 A1* | 7/2019 | Park | H04L 1/0003 |
| 2019/0253986 A1* | 8/2019 | Jeon | H04B 7/0626 |
| 2019/0254110 A1 | 8/2019 | He et al. | |
| 2019/0268918 A1* | 8/2019 | Baghel | H04W 4/40 |
| 2019/0268931 A1* | 8/2019 | He | H04B 7/2615 |
| 2019/0274121 A1* | 9/2019 | Wu | H04W 72/042 |
| 2019/0320475 A1* | 10/2019 | Li | H04W 8/005 |
| 2019/0349116 A1 | 11/2019 | Hosseini et al. | |
| 2019/0363843 A1* | 11/2019 | Gordaychik | H04W 52/58 |
| 2019/0373617 A1* | 12/2019 | Sun | H04W 88/02 |
| 2019/0386770 A1* | 12/2019 | Wei | H04L 1/0003 |
| 2019/0387470 A1 | 12/2019 | Nam et al. | |
| 2019/0393983 A1* | 12/2019 | Ookubo | H04L 1/0041 |
| 2020/0008270 A1* | 1/2020 | Zhang | H04L 1/0004 |
| 2020/0022144 A1 | 1/2020 | Papasakellariou | |
| 2020/0029318 A1* | 1/2020 | Guo | H04W 72/042 |
| 2020/0053835 A1* | 2/2020 | Ye | H04L 1/0003 |
| 2020/0067530 A1* | 2/2020 | Xu | H04L 1/0041 |
| 2020/0127786 A1* | 4/2020 | Kwak | H04L 5/0091 |
| 2020/0154404 A1 | 5/2020 | Goktepe et al. | |
| 2020/0163103 A1* | 5/2020 | Kuang | H04W 72/1257 |
| 2020/0178123 A1* | 6/2020 | Shan | H04W 36/0016 |
| 2020/0204289 A1 | 6/2020 | Yoshimoto et al. | |
| 2020/0221429 A1* | 7/2020 | Li | H04W 72/042 |
| 2020/0221503 A1* | 7/2020 | Kusashima | H04W 74/0833 |
| 2020/0252158 A1* | 8/2020 | Shen | H04L 1/0072 |
| 2020/0267708 A1* | 8/2020 | Alasti | H04W 72/1215 |
| 2020/0275491 A1* | 8/2020 | Ren | H04W 72/042 |
| 2021/0120528 A1* | 4/2021 | Peng | H04W 72/042 |
| 2021/0160844 A1* | 5/2021 | Lin | H04L 1/0072 |
| 2021/0267015 A1* | 8/2021 | Pan | H04W 28/0278 |
| 2021/0321233 A1* | 10/2021 | Mach | H04W 4/46 |

FOREIGN PATENT DOCUMENTS

| | | |
|---|---|---|
| WO | 2019/036578 | 2/2019 |
| WO | 2020/033628 | 2/2020 |

OTHER PUBLICATIONS

Broadcom Corporation, "MCS table design for 256 QAM," 3GPP TSG-RAN WG1 Meeting #76bis, R1-141501, Shenzhen, China (Mar. 31-Apr. 4, 2014).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.Nov. 2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

Interdigital Inc., "Discussion on Uu-based Sidelink Resource Allocation and Configuration," 3GPP TSG RAN WG1 Meeting #95, R1-1813231, Spokane, USA (Nov. 12-16, 2018).

Interdigital Inc., "Enhancement of NR Uu Interface for LTE Sidelink," 3GPP TSG RAN WG1 Meeting #94bis, R1-1811216, Chengdu, China (Oct. 8-12, 2018).

Interdigital Inc., "Enhancement of Uu Interface for NR Sidelink," 3GPP TSG RAN WG1 Meeting #94bis, R1-1811215, Chengdu, China (Oct. 8-12, 2018).

Interdigital Inc., "NR Uu Interface Enhancement for LTE Sidelink," 3GPP TSG RAN WG1 Meeting #94, R1-1809097, Gothenburg, Sweden (Aug. 20-24, 2018).

Interdigital Inc., "On Uu-based Sidelink Resource Allocation and Configuration," 3GPP TSG RAN WG1 Ad-Hoc Meeting 1901, R1-1900801, Taipei, Taiwan (Jan. 21-25, 2019).

Interdigital Inc., "Uu Interface Enhancement for NR Sidelink," 3GPP TSG RAN WG1 Meeting #94, R1- 1809096, Gothenburg, Sweden (Aug. 20-24, 2018).

(56) References Cited

OTHER PUBLICATIONS

Naik et al., "IEEE 802.11bd & 5G NR V2X: Evolution of Radio Access Technologies for V2X Communications," pp. 1-12 (Mar. 26, 2019) available at https://arxiv.org/pdf/1903.08391.pdf.

Third Generation Partnership Project, "Technical Specification Group Radio Access Network; Evolved Universal Terrestrial Radio Access (E-UTRA); Multiplexing and channel coding (Release 15)," 3GPP TS 36.212 V15.2.0 (Jun. 2018).

Third Generation Partnership Project, "Technical Specification Group Radio Access Network; Evolved Universal Terrestrial Radio Access (E-UTRA); Multiplexing and channel coding (Release 15)," 3GPP TS 36.212 V15.6.0 (Jun. 2019).

Third Generation Partnership Project, "Technical Specification Group Radio Access Network; Evolved Universal Terrestrial Radio Access (E-UTRA); Physical layer; Measurements (Release 15)," 3GPP TS 36.214 V15.2.0 (Jun. 2018).

Third Generation Partnership Project, "Technical Specification Group Radio Access Network; Evolved Universal Terrestrial Radio Access (E-UTRA); Physical layer; Measurements (Release 15)," 3GPP TS 36.214 V15.3.0 (Sep. 2018).

Vodafone, "New SID: Study on NR V2X," 3GPP TSG RAN Meeting #80, RP-181429 (RP-181480), La Jolla, USA (Jun. 11-14, 2018).

\* cited by examiner

UU INTERFACE ENHANCEMENT FOR NR V2X

BACKGROUND

In long term evolution (LTE) vehicle to anything (V2X) there are two modes for the WTRU to operate in: Mode 3, in which the WTRU obtains the sidelink transmission resources from network (i.e., eNB); and Mode 4 in which the WTRU autonomously selects/determines the sidelink transmission resources by itself, via some sensing and resource selection procedure. LTE V2X does not use HARQ feedback and uses a fixed MCS table. New radio (NR) V2X supports unicast, groupcast, and broadcast sidelink. HARQ feedback is supported for unicast and groupcast and multiple MCS tables may be used for ultra-reliable low latency communication (URLLC) purposes. Accordingly, there is a need to support efficient scheduling of both LTE sidelink and NR sidelink in light of added support for unicast and groupcast while meeting reliability requirements.

SUMMARY

Methods, devices, and systems for controlling a sidelink are disclosed. In some examples, a wireless transmit/receive unit connects to a first network access device operating in a first radio access technology (RAT) and obtains resources for sidelink in the first RAT from the first network access device. Thereafter, the WTRU moves out of a coverage area of the first network access device into a coverage area of a second network access device operating in a second RAT. The WTRU obtains or maintains resources for sidelink with devices in the coverage area of the first network access device from the second network access device.

A method and apparatus for performing sidelink communications in a wireless transmit receive unit (WTRU) using Long Term Evolution (LTE) and New Radio (NR) technologies is described herein. A WTRU receives downlink control information (DCI) on a physical downlink control channel (PDCCH) from a gNodeB (gNB), wherein the DCI is associated with a cyclic redundancy check (CRC). The a determination is made as to whether the DCI is for an LTE or NR technology sidelink transmission. On a condition that the DCI is for NR technology, the WTRU determines which transmit modulation and coding scheme (MCS) table to apply based on the masking of at least some of the bits in the CRC. Then the WTRU transmits sidelink data on resources indicated by the DCI using the determined MCS table. The WTRU may also receive HARQ feedback on resources indicated by the DCI for HARQ feedback.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
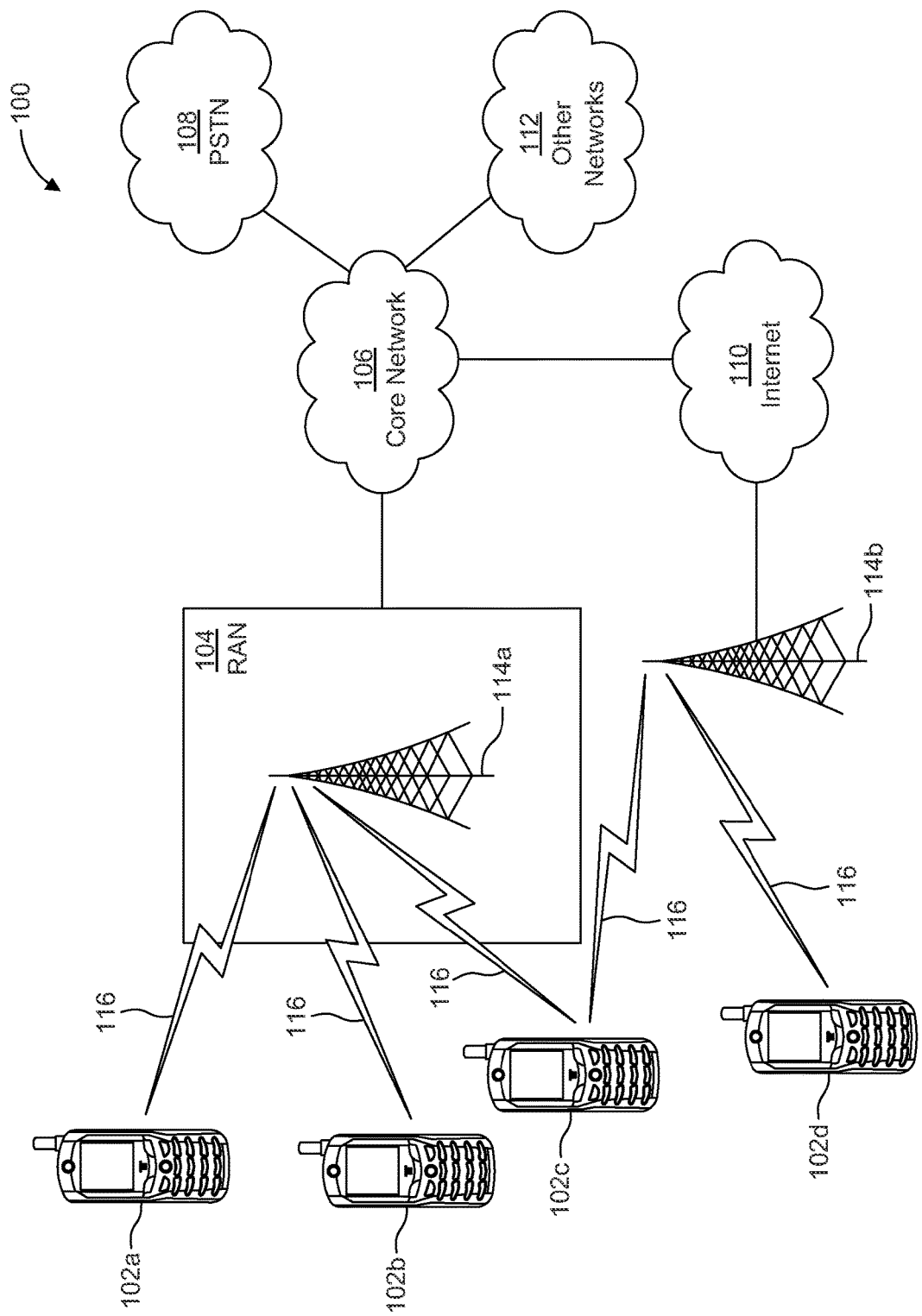
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA," may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
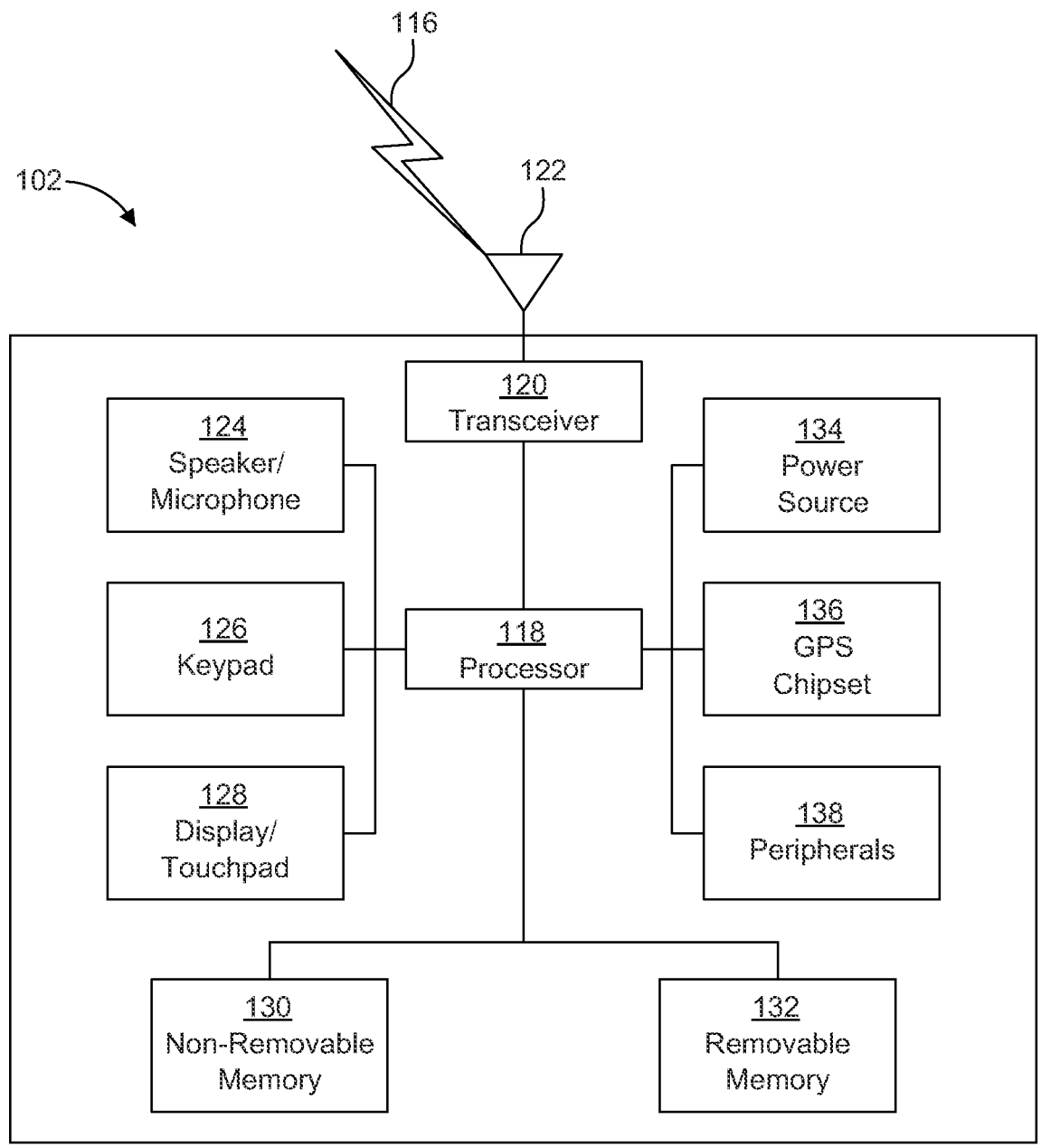
FIG. 1B is a system diagram illustrating an example wireless transmit/receive unit (WTRU) that may be used within the communications system illustrated in FIG. 1A according to an embodiment.
Figure 1C:
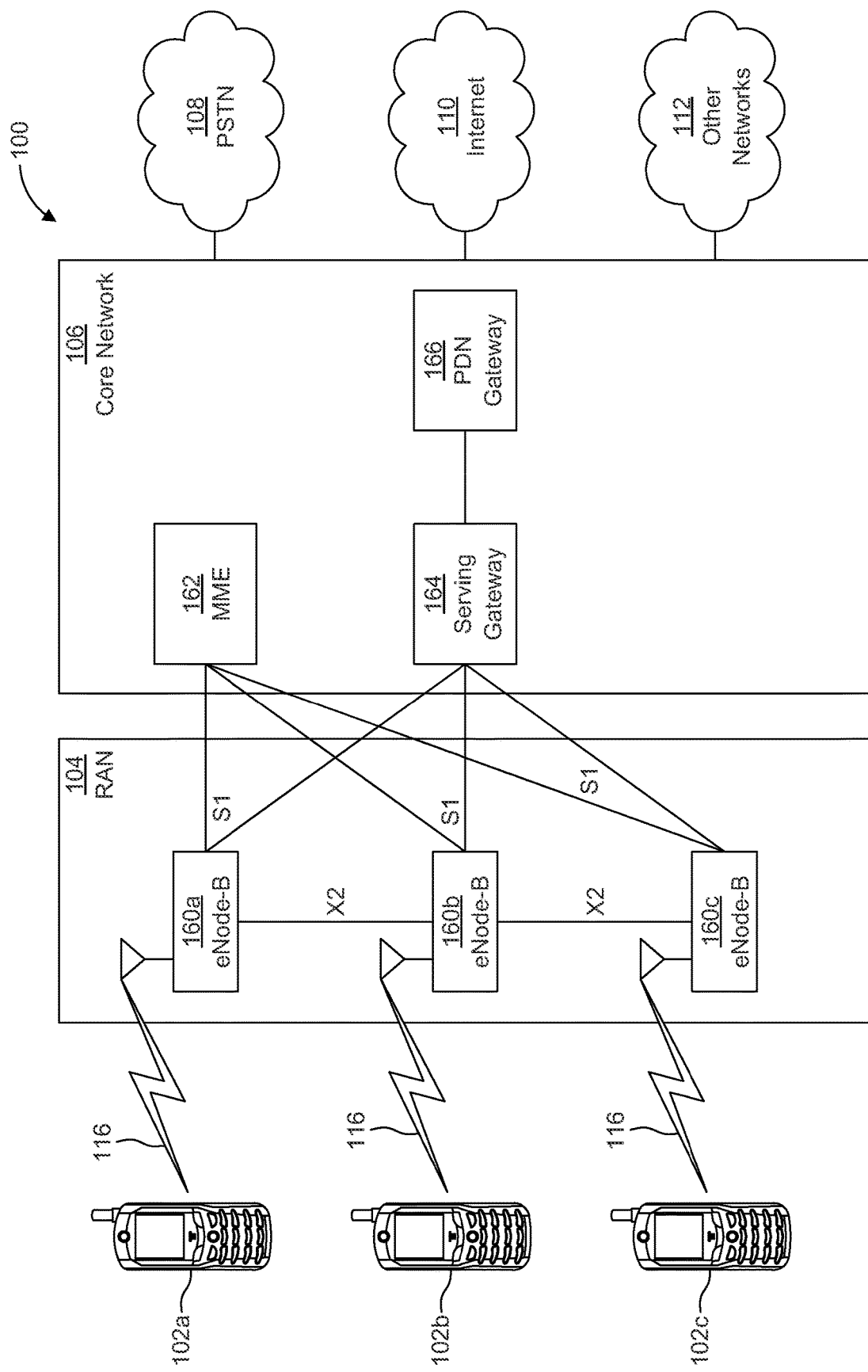
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
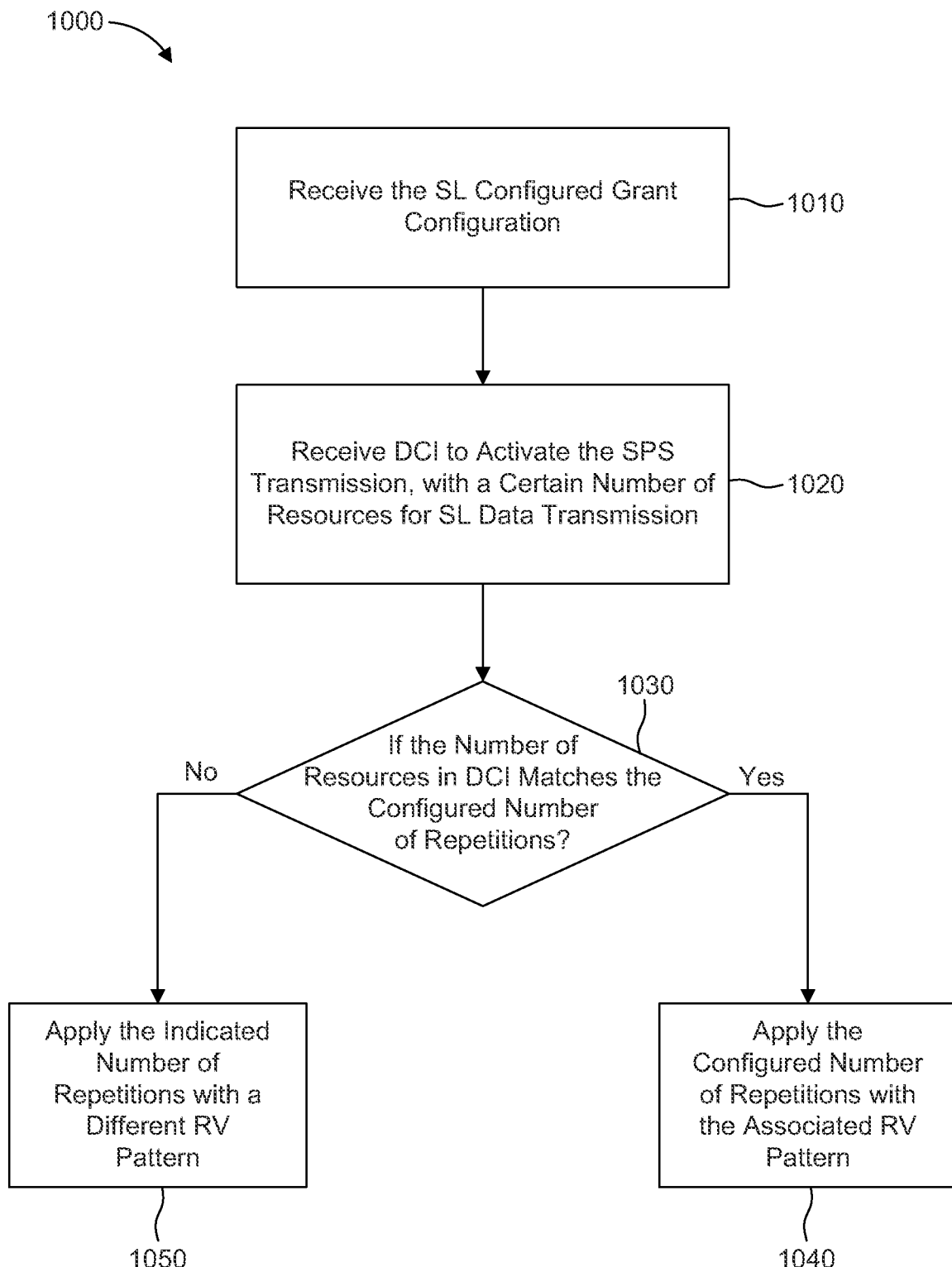
FIG. 10 is a flow chart illustrating an example of such a WTRU procedure for determining the number of repetitions and its associated RV pattern in the sidelink.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
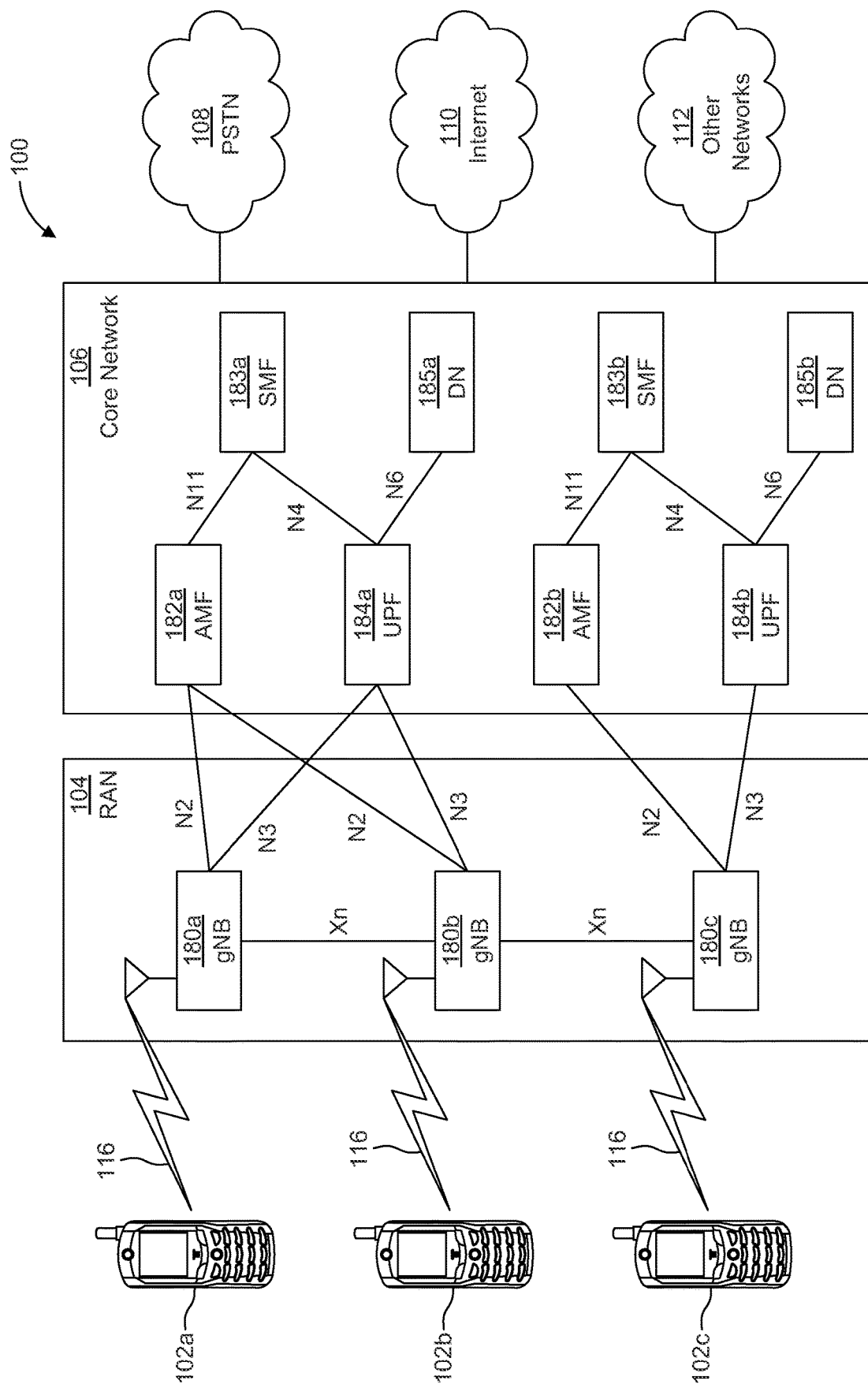
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In 3GPP "vehicle-to-vehicle," "vehicle-to-infrastructure," or "vehicle to everything" communications (V2X), a vehicle may be in transmission mode 3 (i.e., may be a mode 3 user) or may be in transmission mode 4 (i.e., may be a mode 4 user). A mode 3 user directly uses the resources allocated by a base station for the sidelink (SL) communication among vehicles or between vehicle and a pedestrian. A mode 4 user may obtain a list of candidate resources allocated by a base station, and may select a resource among the candidate resources for its SL communication.

As used herein, "user," "UE," or "WTRU" may refer to a vehicle (user). These terminologies are interchangeable.

In LTE, downlink control information (DCI) format 5A is used for the scheduling of PSCCH, as well as several SCI format 1 fields used for the scheduling of PSSCH. The payload of DCI format 5A includes:

Carrier indicator—3 bits

Lowest index of the subchannel allocation to the initial transmission—$\lceil \log_2(N_{subchannel}^{SL}) \rceil$ bits SCI format 1 fields:

Frequency resource location of initial transmission and retransmission.

Time gap between initial transmission and retransmission.

SL index—2 bits (this field is present only for cases with TDD operation with uplink-downlink configuration 0-6).

If the format 5A CRC is scrambled with SL-SPS-V-RNTI, the following fields are present:

SL SPS configuration index—3 bits

Activation/release indication—1 bit

If the number of information bits in format 5A mapped onto a given search space is less than the payload size of format 0 mapped onto the same search space, zeros shall be appended to format 5A until the payload size equals that of format 0 including any padding bits appended to format 0.

If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

In LTE, SCI format 1 is used for the scheduling of PSSCH. The payload of SCI format 1 includes:

Priority—3 bits

Resource reservation—4 bits

Frequency resource location of initial transmission and retransmission—$\lceil \log_2(N_{subchannel}^{SL})(N_{subchannel}^{SL}+1)/2) \rceil$ Time gap between initial transmission and retransmission—4 bits Modulation and coding scheme—5 bits Retransmission index—1 bit Transmission format—1 bit Reserved information bits are added until the size of SCI format 1 is equal to 32 bits. The reserved bits are set to zero.

In LTE, once a WTRU is camped on a cell, it may receive system information block 21 (SIB21), which contains a V2X sidelink communication configuration. The SIB21 includes the information element (IE) of SL-V2X-ConfigCommon with components of v2x-CommRxPool, v2x-CommTxPool-NormalCommon, v2-CommTxPoolExceptional, v2x-InterFreqInfoList, etc. Here, v2x-InterFreqInfoList is a list of up to 7 neighboring frequencies for V2X sidelink communication.

The vehicle WTRU could inform eNB that it is or is not interested to receive V2X sidelink communication or to request assignment or release of transmission resources for V2X sidelink communication.

Furthermore, WTRU and eNB could exchange messages for RRCConnectionReconfiguration, which includes the IE of SL-V2X-ConfigDedicated with components of commTxResources, v2x-InterFreqInfoList, etc.

Figure 2:
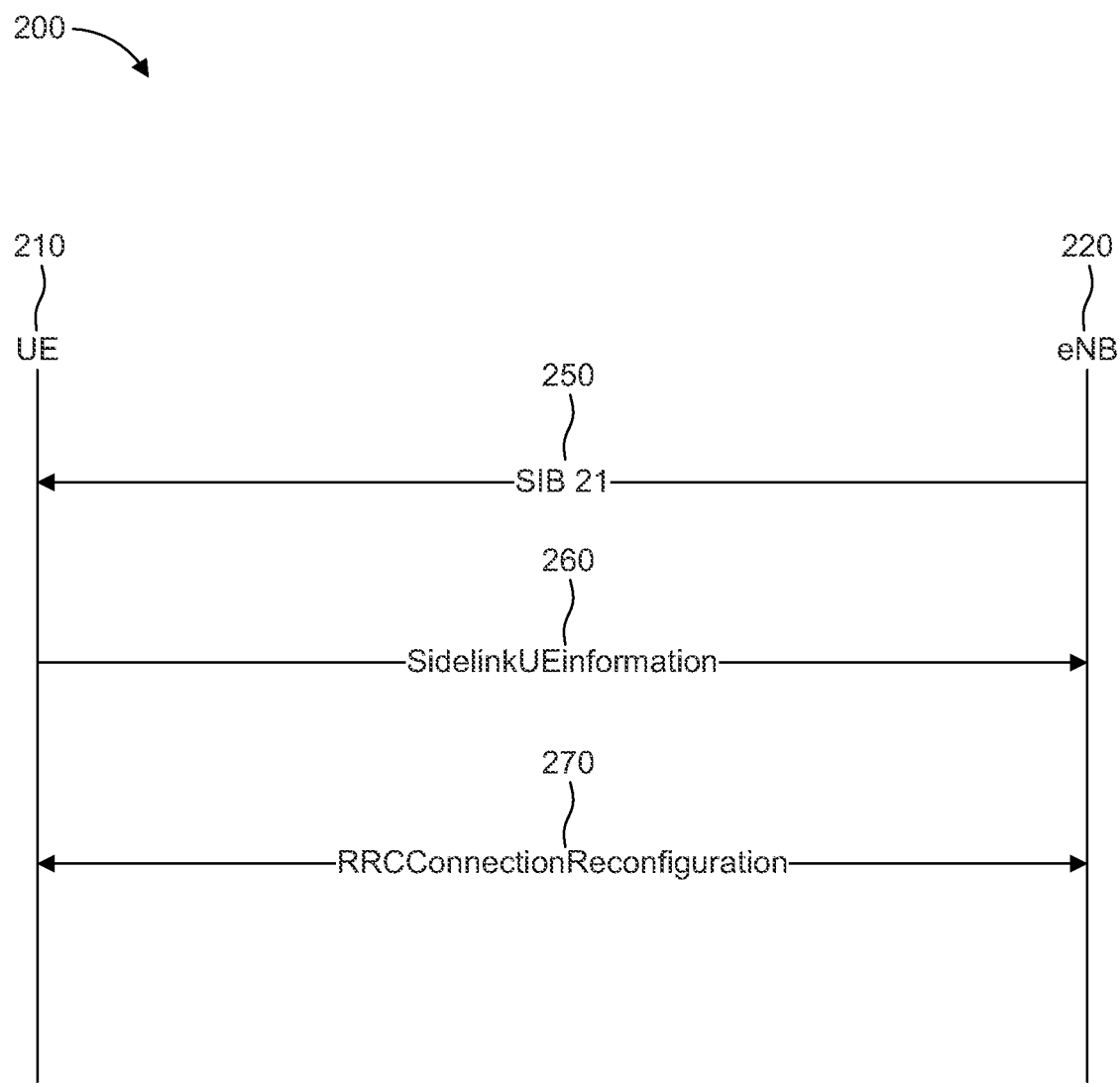
FIG. 2 is a message sequence chart illustrating exemplary call flows of the communications between WTRU and eNB for V2X sidelink transmissions.

FIG. 2 is a message sequence chart illustrating exemplary call flows of the communications between WTRU and eNB for V2X sidelink transmissions. Call flow 200 is used for signaling sidelink information between user equipment (WTRU) 210 and an eNodeB (eNB) 220. The signaling exchange begins with the eNB 220 sending system block 21 (SIB 21) 250 to the WTRU 210. Next, the WTRU 210 sends back SidelinkUEinformation 260 to the eNB 220. Then, the WTRU 210 and the eNB 220 may exchange messages for RRCConnectionRecongifuration 270. It should be noted that the RRCConnectionReconfiguration 270 may include an information element of SL-V2X-ConfigDedicated with components of commTxResources, v2x-InterFreqInfoList, and the like.

In NR V2X, Uu-based sidelink resource allocation/reconfiguration may imply enhancements of LTE Uu and NR Uu to control NR sidelink from the cellular network, and/or enhancements of NR Uu to control LTE sidelink from the cellular network.

In LTE, semi-persistent scheduling (SPS) is used for downlink, uplink and sidelink. For uplink and sidelink, up to 8 SPS configurations may be defined. For UL grant in DCI format 0, the UL SPS configuration index is provided with implicit SPS activation and deactivation indication. For SL grant in DCI format 5A, the SL SPS configuration index is provided with explicit SPS activation and deactivation indication.

In NR, SPS is used for downlink. For uplink, there are two configured grant types. Configured grant type 2 is similar to SPS configurations. Configured grant type 1 is defined and triggered without L1 activation. The ConfiguredGrantConfig IE has a field of rrc-ConfiguredUplinkGrant. If this field is not absent, then UL grant type 1 is configured. Otherwise UL grant type 2 is configured. For UL grant type 1, it needs to configure the resource location and transmission parameters, as no L1 signaling is used. This information is contained in Table 1:

TABLE 1

| | |
|---|---|
| rrc-ConfiguredUplinkGrant | SEQUENCE { |
| timeDomainOffset | INTEGER (0..5119), |
| timeDomainAllocation | INTEGER (0..15), |
| frequencyDomainAllocation | BIT STRING (SIZE(18)), |
| antennaPort | INTEGER (0..31), |
| dmrs-SeqInitialization | INTEGER (0..1) |
| OPTIONAL, -- Cond NoTransformPrecoder | |
| precodingAndNumberOfLayers | INTEGER (0..63), |
| srs-ResourceIndicator | INTEGER (0..15), |
| mcsAndTBS | INTEGER (0..31), |
| frequencyHoppingOffset | INTEGER (1.. maxNrofPhysicalResourceBlocks-1) |
| OPTIONAL, -- Need M | |
| pathlossReferenceIndex PathlossReferenceRSs-1), | INTEGER (0..maxNrofPUSCH- |
| ... | |
| } | |

It may be desired to implement a NR Uu capable of controlling both NR sidelink and LTE sidelink. In LTE V2X, the Uu interface is used to configure the WTRU for sidelink communications, e.g., resource pool configurations, PSSCH transmission configurations, synchronization signal configurations, mode 4 WTRU spectrum sensing configurations, etc. The Uu interface also provides a dynamic resource allocation for mode 3 WTRUs.

Similarly, in NR V2X, the Uu interface could be used to configure the WTRU for the sidelink communications, as well as dynamically allocate NR resources for sidelink communications of mode 3 WTRUs.

Since NR has different physical layer structures and procedures from LTE, the NR Uu interface may need to be modified from the LTE Uu interface. Further, unlike the LTE sidelink, which supports only broadcast, the NR sidelink may support group-cast or unicast. Thus, the NR Uu interface may need to support NR sidelink group-cast or unicast. Accordingly, it may be desired to modify the NR Uu interface to support the configuration and dynamic resource allocation for NR unicast or group-cast sidelink.

The NR Uu interface may be implemented so as to support both LTE sidelink and NR sidelink simultaneously. For example, if a mode 3 vehicle is communicating with other vehicles via an LTE sidelink, and if this vehicle moves out of the coverage of LTE network, it cannot further obtain sidelink transmission resources from the LTE eNB. However, if this vehicle is in coverage of NR gNB, it may still obtain the resource allocation from the NR gNB for its LTE sidelink transmissions.

Accordingly, it may be desired to implement a NR Uu interface such that it supports the dynamic resource allocation for LTE sidelink. Further, the NR Uu interface may need to be enhanced to have the flexibility to dynamically adjust the number of repetitions in grant free sidelink transmissions, e.g., due to resource limitations or other factors.

In LTE V2X, only one modulation and coding scheme (MCS) table is used. In NR URLLC use cases, two MCS tables could be used. Both MCS tables may support up to 64QAM modulation, while one MCS table contains lower spectrum efficiency entries (e.g., down to 30/1024*2) than the other (e.g., legacy) MCS table. The selection of which MCS table to use may depend on RRC configurations or may be dynamically indicated by physical layer.

Since V2X is considered as an application use scenario of URLLC and it has the reliability requirement of $1\text{-}10^{-5}$ in several use cases, it is reasonable that V2X uses both MCS tables. Hence, the configuration and dynamic indication of which MCS table is used for NR V2X sidelink transmissions, may need to be designed.

Figure 3:
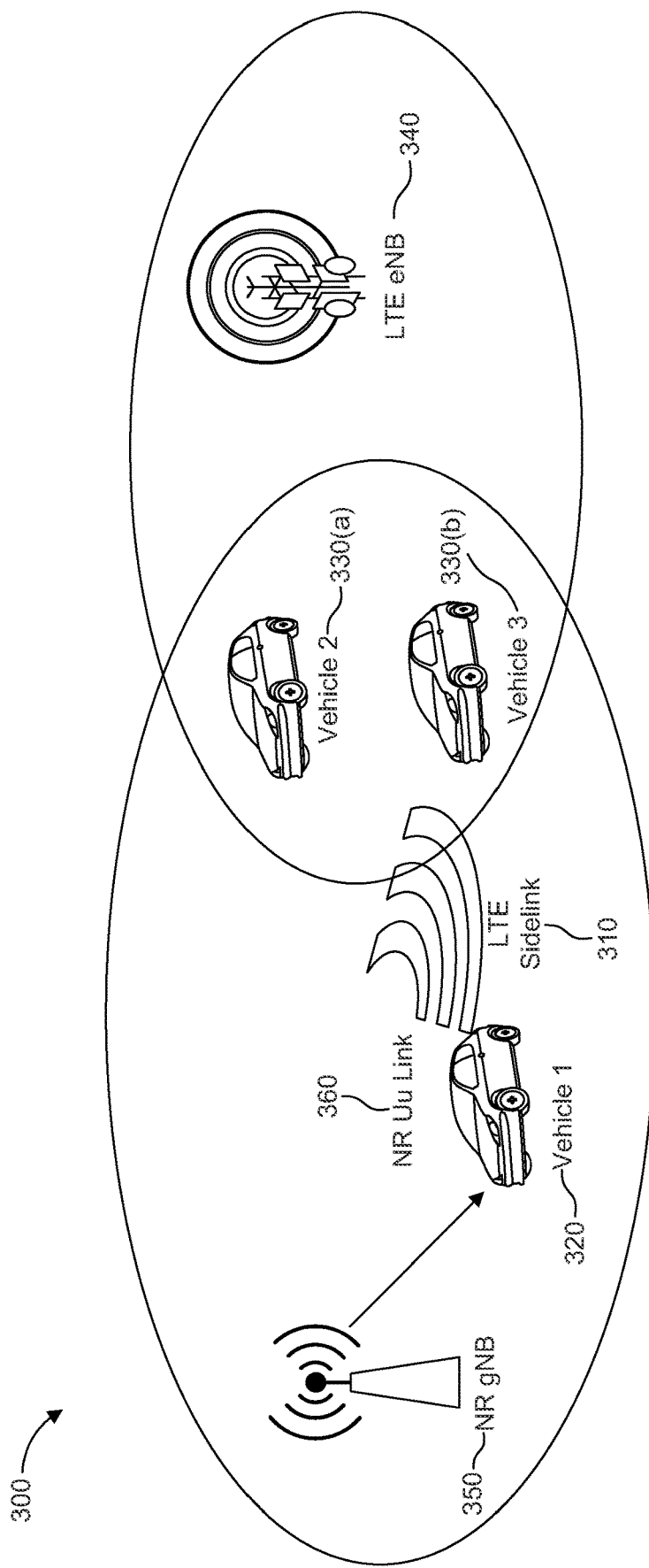
FIG. 3 is a Venn diagram illustrating an example usage scenario for a NR Uu enhancement to control LTE sidelink.

Some embodiments include a NR Uu enhancement to control NR and LTE sidelink. FIG. 3 is a Venn diagram illustrating an example usage scenario for a NR Uu enhancement to control LTE sidelink. In FIG. 3, vehicle 1 is a moIn LTE V2X, there are two modes for WTRU Mode 3: WTRU obtains the sidelink transmission resources from network (i.e., eNB)

Mode 4: WTRU autonomously selects/determines the sidelink transmission resources by itself, via some sensing and resource selection procedure. de 3 WTRU, and it communicates with other vehicles (e.g., vehicle 2 and vehicle 3) via a LTE sidelink.

FIG. 3 illustrates an exemplary scenario 300 of NR Uu enhancement to control LTE sidelink 310. Vehicle 1 320 is a mode 3 WTRU capable of communicating with vehicle 2 330(a) and vehicle 3 330(b). Initially, vehicle 1 320 is within an LTE coverage area and obtains resources for its sidelink transmissions from the LTE eNB 340. Later, vehicle 1 320 may move out of LTE coverage and into NR coverage. The NR gNB 350 may communicate with vehicle 1 320 via an NR Uu link 360. Vehicle 1 320 may maintain the LTE sidelink 310 as well as the sidelink channel configuration from NR gNB 350 via an NR Uu link 360.

Initially, vehicle 1 is within LTE coverage, and it obtains the resources for its sidelink transmissions from the LTE eNB. Later, vehicle 1 moves out of LTE coverage, but it is in the coverage of NR. The NR gNB communicates with Vehicle 1 via an NR Uu link. To maintain the LTE sidelink, vehicle 1 wishes to receive the sidelink transmission resource information, as well as the sidelink channel configurations, from NR gNB via NR Uu link.

Some examples include a WTRU procedure for configuring NR V2X sidelink monitoring. In some examples, a WTRU is configured by a higher layer to receive V2X sidelink communications. Table 2 includes pseudocode for an example procedure may be followed for the WTRU in such cases, to determine the parameters for receiving V2X sidelink communications:

TABLE 2

If the WTRU is in coverage on the frequency used for V2X sidelink communication
    If the frequency used to receive V2X sidelink communication is included in v2x-InterFreqInfoList,
configure lower layers to monitor sidelink control information in v2x-CommRxPool of v2x-InterFreqInfoList.
    Elseif the frequency used to receive V2X sidelink communication is included in v2x-InterRATInfoList,
configure lower layers to monitor sidelink control information in v2x-CommRxPool of v2x-InterRATInfoList.
    Else, configure lower layers to monitor sidelink control information in v2x-CommRxPool of SIB-V2X
or RRCConnectionReconfiguration.
Else (WTRU is out of coverage)
    If the frequency used to receive V2X sidelink communication is included in v2x-InterFreqInfoList,
configure lower layers to monitor sidelink control information in v2x-CommRxPool of v2x-InterFreqInfoList.
    Elseif the frequency used to receive V2X sidelink communication is included in v2x-InterRATFreqInfoList, configure lower layers to monitor sidelink control information in v2x-CommRxPool of v2x-InterRATFreqInfoList.
    Else, configure lower layers to monitor sidelink control information in v2x-CommRxPool of SL-V2X-Preconfiguration.

Table 3 includes pseudocode for an alternative expression of this example procedure:

TABLE 3

If the frequency used to receive V2X sidelink communication is included in v2x-InterFreqInfoList, configure lower layers to monitor sidelink control information in v2x-CommRxPool of v2x-InterFreqInfoList.
    Elseif the frequency used to receive V2X sidelink communication is included in v2x-InterRATFreqInfoList, configure lower layers to monitor sidelink control information in v2x-CommRxPool of v2x-InterRATFreqInfoList.
    Elseif the UE is in coverage on the frequency used for V2X sidelink communication configure lower layers to monitor sidelink control information in v2x-CommRxPool of SIB-V2X or RRCConnectionReconfiguration.
    Else, configure lower layers to monitor sidelink control information in v2x-CommRxPool of SL-V2X-Preconfiguration.

Figure 4:
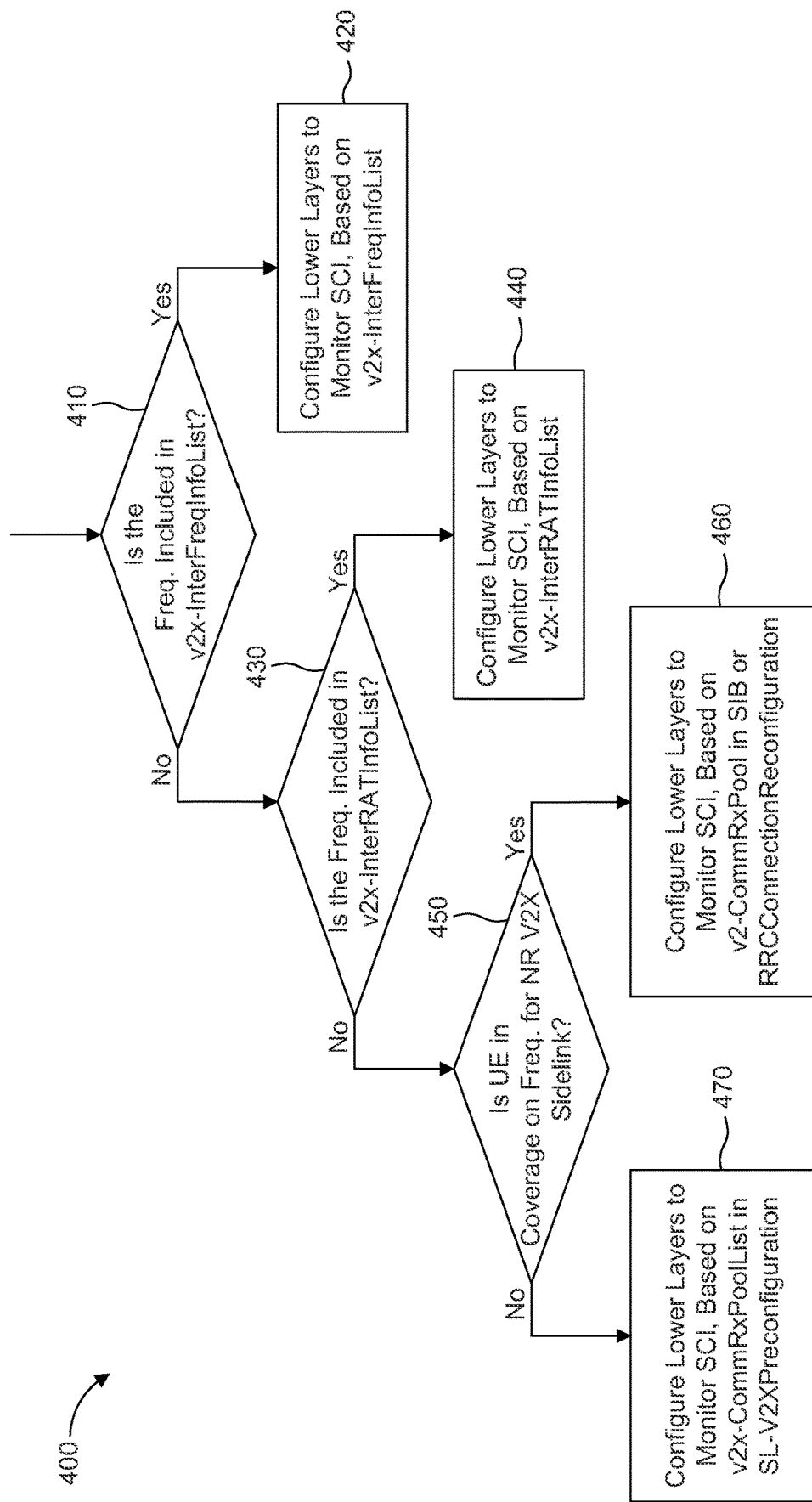
FIG. 4 is a flowchart illustrating an example WTRU procedure for configuring NR V2X sidelink communication monitoring.

FIG. 4 is a flowchart illustrating an example WTRU procedure for configuring NR V2X sidelink communication monitoring. WTRU procedure 400 is used to configure NR V2X sidelink communication monitoring. If the frequency is used to receive V2X sidelink communication included in v2x-InterFreqInfoList 410, lower layers may be configured to monitor SCI, based on v2x-InterFreqInfoList 420. Otherwise, if the frequency used to receive V2X sidelink communication is included in v2x-InterRATInfoList 430; lower layers may be configured to monitor SCI, based on v2x-InterRATInfoList 440. Otherwise, if the WTRU is in coverage in a frequency for NR V2X sidelink 450, lower layers may be configured to monitor SCI, based on v2CommRxPool in SIB or RRCConnectionReconfiguration 460. Otherwise, if the WTRU is not in coverage, lower layers may be configured to monitor SCI, based on v2x-CommRxPoolList in SL-V2X-Preconfiguration 470.

In the example procedures described above and with respect to Tables 2 and 3, and FIG. 4, the v2x-InterRATInfoList may be a list of several neighboring frequencies for LTE V2X sidelink communication. Thus, the data structure of v2x-InterRATInfoList may be the same as "SL-InterFreqInfoListV2X-r14".

The data structure of v2x-InterFreqInfoList may be defined as "SL-InterFreqInfoListV2X-r16", which could have different SL-CommResourcePoolV2X parameter definitions from that of LTE. For example, NR generally has a larger bandwidth than LTE, and it supports up to 275 Resource Blocks (RBs) in a channel. Accordingly, the values of "startRB-Subchannel," "startRB-PSCCH-Pool," and "SizeSubchannel" may be different from LTE. This is shown as follows. Furthermore, the number of sub-channels in a channel for NR could be larger to support more V2X sidelink communication.

TABLE 4

```
SL-InterFreqInfoListV2X-r16 ::= SEQUENCE (SIZE (0..maxFreqV2X-1-r16)) OF SL-InterFreqInfoV2X-
r16
SL-InterFreqInfoV2X-r16 ::=                    SEQUENCE {
        v2x-SchedulingPool                     SL-CommResourcePoolV2X-r16
        ...
}
SL-CommResourcePoolV2X-r16 ::=                 SEQUENCE {
sizeSubchannel                                 ENUMERATED {
                                                   n4, n5, n6, n8, n9, n10, n12, n15, n16, n18, n20, n25, n30,
                                                   n48, n50, n72, n75, n96, n100, n120, n150, n160, n180, n200,
                                                   n250, n275, spare6, spare5, spare4, spare3, spare2,
spare1},
    numSubchannel                              ENUMERATED {n1, n3, n5, n8, n10, n15, n20, n25, n30, n40, n50,
                                                   spare5, spare4, spare3, spare2, spare1},
    startRB-Subchannel                         INTEGER (0..274),
    startRB-PSCCH-Pool                         INTEGER (0..274)    OPTIONAL,    -- Need OR
    ...
}
```

The v2x-InterFreqInfoList and v2x-InterRATInfoList defined above with respect to Table 4 may be component elements of the IEs of SL-V2X-ConfigDedicated, SL-V2X-ConfigCommon and SL-V2X-PreconfigFreqInfo.

TABLE 5

```
SL-V2X-ConfigDedicated ::=                     SEQUENCE {
        v2x-InterFreqInfoList                      SL-InterFreqInfoListV2X-r16
        v2x-InterRATInfoList                       SL-InterFreqInfoListV2X-r14
        ......
}
SL-V2X-ConfigCommon ::=                        SEQUENCE {
        v2x-InterFreqInfoList                      SL-InterFreqInfoListV2X-r16
        v2x-InterRATInfoList                       SL-InterFreqInfoListV2X-r14
        ......
}
```

TABLE 5-continued

```
SL-V2X-PreconfigFreqInfo ::=            SEQUENCE {
    v2x-CommRxPoolList                      SL-Preconfig V2X-RxPoolList-r16,
    v2x-CommTxPoolList                          SL-PreconfigV2X-TxPoolList-r16,
    v2x-CommRxPoolList-InterRAT                 SL-PreconfigV2X-RxPoolList-r14,
    v2x-CommTxPoolList-InterRAT                 SL-PreconfigV2X-TxPoolList-r14,
    ......
}
keSL-PreconfigV2X-RxPoolList:= SEQUENCE  (SIZE  (1..maxSL-V2X-RxPoolPreconf)  OF
   SL-
CommResourcePoolV2X-r16
SL-PreconfigV2X-TxPoolList::= SEQUENCE  (SIZE  (1..maxSL-V2X-TxPoolPreconf))  OF  SL-
CommResourcePoolV2X-r16
SL-V2X-PreconfigFreqList::= SEQUENCE (SIZE (1..maxFreqV2X)) OF SL-V2X-PreconfigFreqInfo
```

The three IEs defined above with respect to Table 5 may be contained in SIB-V2X, RRCConnectionReconfiguration and SL-V2X-Preconfiguration, respectively.

Some examples include a WTRU procedure for configuring NR V2X sidelink transmissions. In some examples, a WTRU is configured by higher layers to transmit V2X sidelink communication. In such examples, the following example procedure, expressed in pseudocode in Table 6 may be implemented for the WTRU to determine the parameters for transmitting V2X sidelink communication.

TABLE 6

If the UE is in coverage on the frequency used for V2X sidelink communication or
if the frequency used to transmit V2X sidelink communication is included in v2x-InterFreqInfoList or v2x-InterRATInfoList,
    If UE is in RRC_CONNECTED,
        If UE is configured with commTxResources= scheduled,
            If some exceptional condition occurs, then apply Random Selection using the pool indicated in v2x-CommTxPoolExceptional.
            Otherwise, configure lower layers to request gNB to assign transmission resources for V2X sidelink communications.
        Elseif UE is configured with v2x-CommTxPoolNormalDedicated or v2x-CommTxPoolNormal in the entry of v2x-InterFreqInfoList, then apply Sensing based selection using the pool indicated in v2x-Comm TxPoolNormalDedicated or v2x-CommTxPoolNormal.
        Elseif UE is configured with v2x-CommTxPoolNormalDedicated or v2x-CommTxPoolNormal in the entry of v2x-InterRATInfoList, then apply Sensing based selection using the pool indicated in v2x-CommTxPoolNormalDedicated or v2x-CommTxPoolNormal.
    Else (UE is in RRC_IDLE),
        Apply Random Selection using the pool indicated in v2x-CommTxPoolNormalDedicated, v2x-CommTxPoolNormal or v2x-CommTxPoolExceptional.
Else
    Apply Sensing based selection using the pool indicated in SL-V2X-Preconfiguration.

Figure 5:
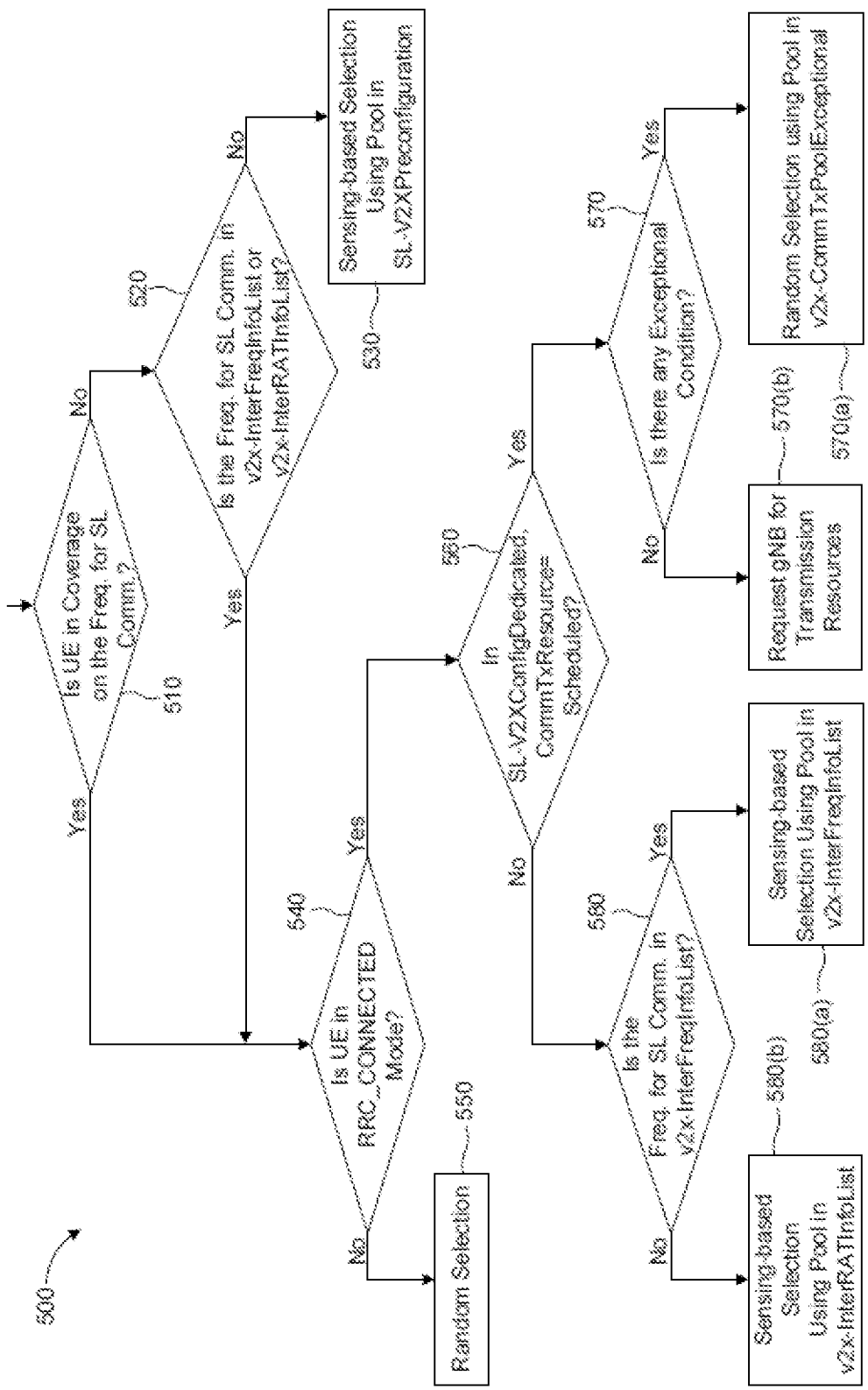
FIG. 5 is a flowchart illustrating aspects of the WTRU procedure for configuring NR V2X sidelink transmissions.

FIG. 5 is a flowchart illustrating aspects of the WTRU procedure 500 for configuring NR V2X sidelink transmissions, e.g., as described with respect to Table 6. Although the above WTRU procedure considers the RRC connected mode and RRC idle mode, a similar procedure could be applied to RRC inactive mode. For example, the RRC inactive mode could be treated as RRC idle mode in the above procedure. Alternatively, the RRC inactive mode could be treated as RRC connected mode.

In the exemplary WTRU procedure 500 for configuring NR V2X sidelink transmissions, if the WTRU is not in coverage on a frequency used for V2X sidelink communication 510 or if the frequency used to transmit V2X sidelink communication is not included in v2x-InterFreqInfoList or v2x-InterRATInfoList 520, the WTRU may perform sensing-based selection using pool in SL-V2X-Preconfiguration 530. If, the WTRU is in coverage of both V2X sidelink communication 510 or if the frequency used to transmit V2X sidelink communication is included in v2x-InterFreqInfoList or v2x-InterRATInfoList 520, the next step is determining whether the WTRU is in RRC_CONNECTED mode 540. If the WTRU is not in RRC_CONNECTED mode 540, then the WTRU performs random selection of sidelink transmission resources. 550. If the WTRU is in RRC_CONNECTED mode 540, the next step is to determine whether the WTRU is configured with commTxResources=scheduled 560. If the WTRU is configured with commTxResources=scheduled, and there exists an exceptional condition 570, then random selection is applied using pool v2x-CommTxPoolExceptional 570(*a*). If there is no exceptional condition 570, then the WTRU configures lower layers to request gNB 570(*b*) to assign transmission resources for V2X sidelink communications. If the WTRU is not configured with commTxResources=scheduled 560 and if the frequency for SL communication is in v2x-InterFreqInfoList 580, then WTRU may use sensing based selection using pool in v2x-InterFreqInfoList 580(*a*). If the frequency for SL communication is not in v2x-InterFreqInfoList 580, then the WTRU may use sensing-based selection using pool v2x-InterRATInfoList 580(*b*).

Some examples include dynamic scheduling of LTE sidelink and NR sidelink. In some examples, a single WTRU may be able to communicate on both LTE sidelink and NR sidelink. This example WTRU may be configured to be a mode 3 UE for both LTE sidelink and NR sidelink, e.g., based on the NR V2X sidelink transmission procedures discussed above. Such WTRU may rely on the network to allocate the resources for its sidelink transmissions. In this example, the WTRU may be only under NR coverage (i.e., is only attached to and receiving signals from a NR gNB, not from an LTE eNB) and the gNB may dynamically schedule both the LTE sidelink and NR sidelink.

In some examples, the dynamic scheduling may be based on a unified DCI format for V2X. In some examples, the unified DCI format for V2X may include a field, which may be referred to as an NR Indicator field. The NR Indicator field may be used to indicate whether the current DCI is for the LTE sidelink grant or for the NR sidelink grant. In some examples, the NR Indicator field may include 1 bit, e.g., using the value of 1 to indicate that the current DCI is for the NR sidelink grant and using the value of 0 to indicate that the current DCI is for the LTE sidelink grant.

Figure 6:
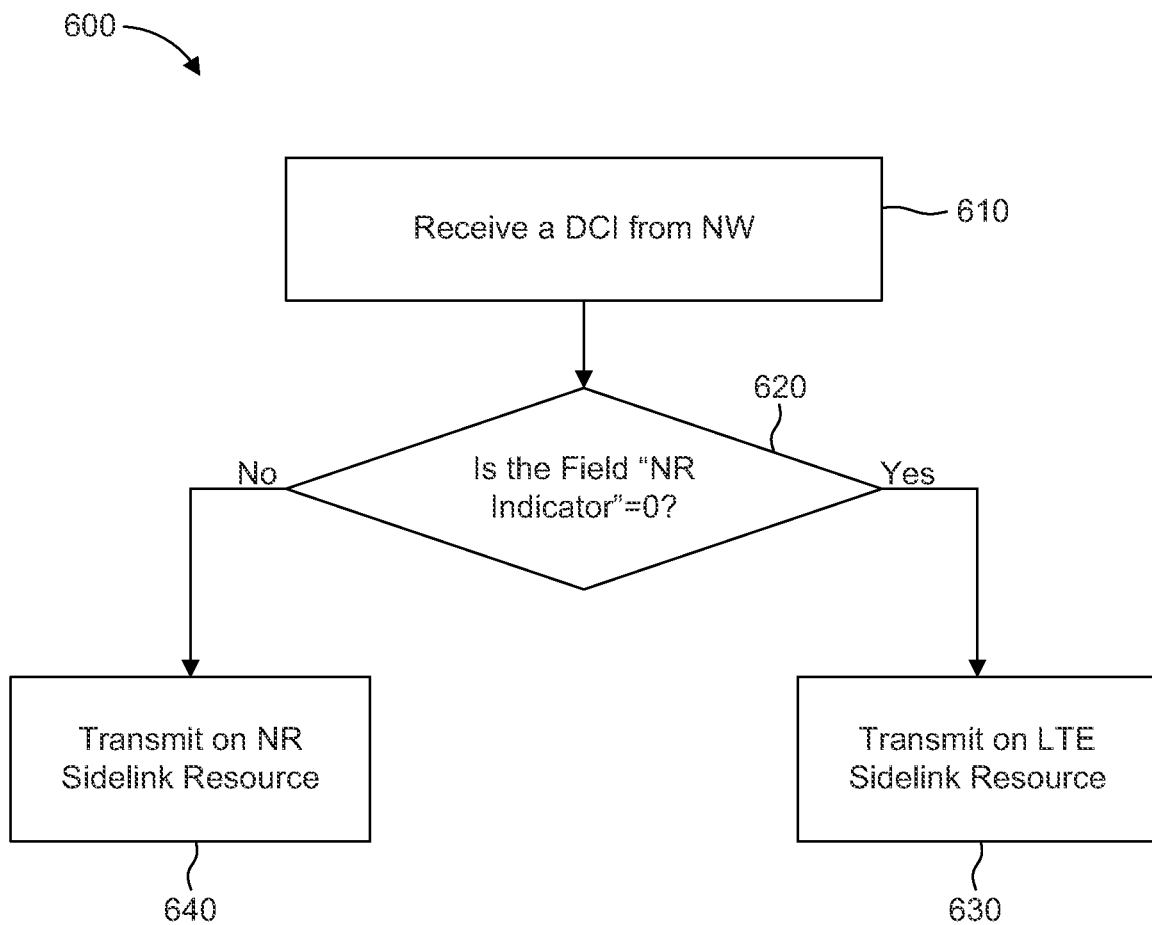
FIG. 6 is a flow chart illustrating an example procedure for a WTRU to determine whether to transmit using LTE sidelink transmissions or NR sidelink transmissions.

After receiving this DCI from NR gNB, the WTRU may first check the NR Indicator field of this DCI. If it is equal to 0 (for example), then the WTRU schedules the transmissions on LTE sidelink, using the grants from the remaining fields of the DCI. If the value is equal to 1 (for example), then the WTRU schedules the transmissions on NR sidelink, using the grants from the remaining fields of the DCI. FIG. 6 is a flow chart illustrating an exemplary (e.g., mode 3) procedure for a WTRU to determine whether to transmit using LTE sidelink transmissions or NR sidelink transmissions (i.e., to determine resource allocation for LTE sidelink or NR sidelink).

FIG. 6 illustrates an exemplary WTRU procedure 600 of choosing between the LTE sidelink transmissions and the NR sidelink transmissions. After receiving the DCI from NW 610, the WTRU may check the field "NR Indicator" of the DCI 620. If the "NR Indicator" 620 is equal to a first value, such as 0, the WTRU may schedule the transmission on the LTE sidelink 630, using the grants from the remaining fields of the DCI. If the "NR Indicator" 620 is equal to a second value, the WTRU may schedule the transmissions on the NR sidelink 640, using the grants from the remaining fields of the DCI.

In some examples, the dynamic scheduling may be based on separate DCI formats for NR sidelink and LTE sidelink. In such examples, the first type of DCI format may be for the legacy (i.e., LTE) sidelink resource allocation, while the second type of DCI format may be for the NR sidelink resource allocation.

These two types of DCI formats may have different payload sizes. In some examples, blind detection is used to distinguish between these two DCI formats. For blind detection, we assume one of the DCI formats is used and apply the corresponding coding, since we do not know which DCI format is used. If the decoding is successful (i.e., CRC check passes) then we know the assumed DCI format is correct. Otherwise, we assume the other DCI format is used and apply the corresponding decoding. These two types of DCI formats may have the same payload size, where a different RNTI may be used for the CRC mask. In some examples, if using the RNTI for LTE sidelink service passes the CRC check, then the DCI format is for LTE sidelink. If using the RNTI for NR sidelink service passes the CRC check, then the DCI format is for NR sidelink.

In some cases, the V2X sidelink communication configurations may be different between a LTE cell and a NR cell. For example, the SL-CommResourcePoolV2X-r16 IE for NR V2X may configure the size of sub-channels in terms of resource blocks, the total number of sub-channels in the resource pool $N_{subchannel}^{SL}$, etc. These sizes may be different from SL-CommResourcePoolV2X IE for LTE V2X. Accordingly, the DCI field sizes of the "Lowest index of sub-channel allocation to initial transmissions" or "Frequency resource location of initial transmission and retransmissions" could be different from LTE cell and NR cell as well.

Figure 7:
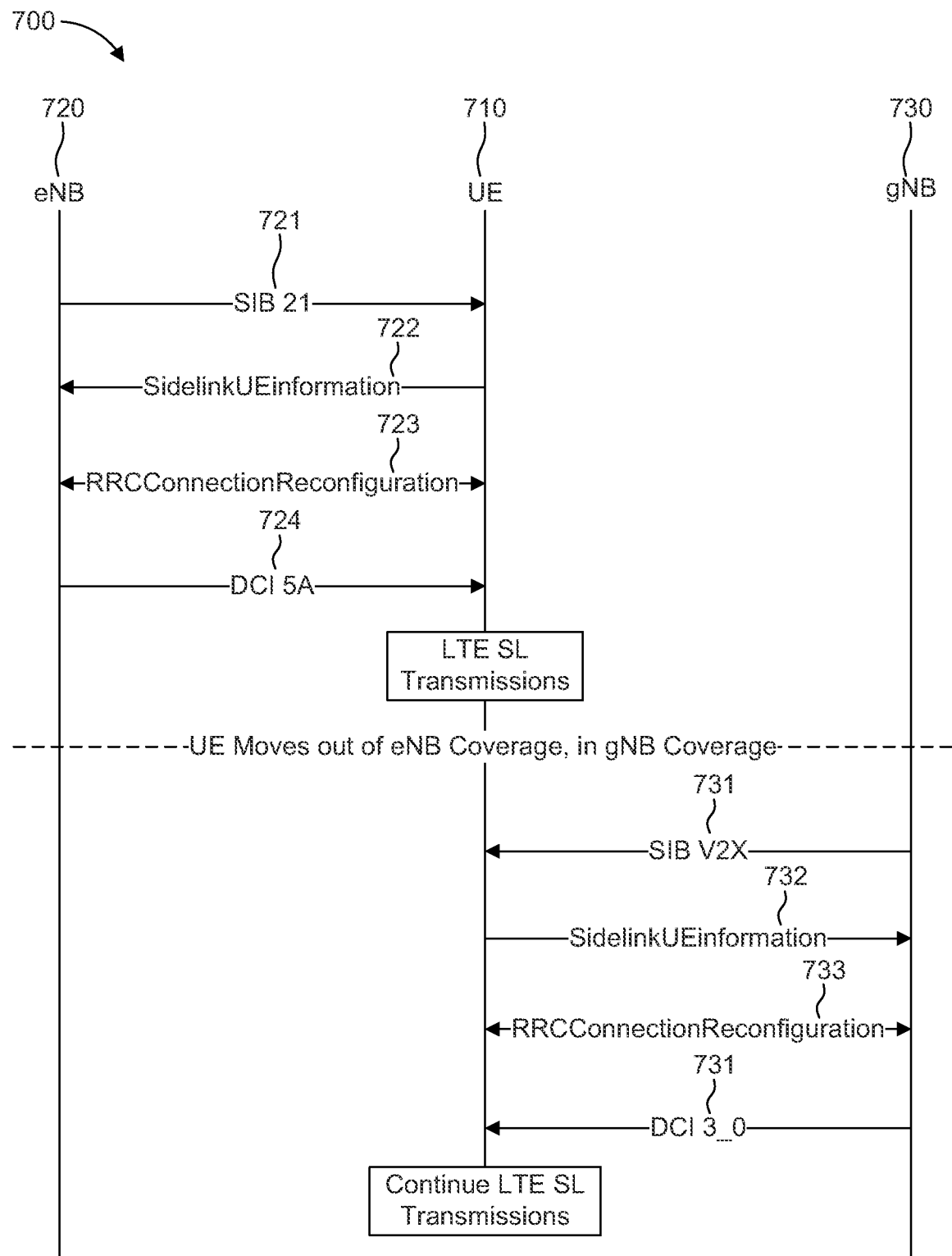
FIG. 7 is a message sequence chart illustrating example message exchanges between a WTRU and an eNB or gNB.

FIG. 7 illustrates an exemplary message exchange 700 between a WTRU 710 and an eNB 720 or a gNB 730. The WTRU 710 may receive SIB21 721 for the LTE V2X sidelink communication common from eNB 720. The WTRU 710 then may send SidelinkUEInformation 722 back to the eNB 720. The WTRU 710 may receive the RRCConnectionReconfiguration and transmit the RRCConnectionReconfigurationComplete. 723 for the LTE V2X sidelink communication dedicated configurations. Based on the configurations, the WTRU 710 may be a mode 3 WTRU and it may receive the dynamic resource allocation via DCI 5A 724 in LTE. The WTRU 710 may move out of the LTE eNB 720 coverage and into the NR gNB 730 coverage. The WTRU 710 may receive the SIB V2X 731 from gNB 730 for NR V2X sidelink communication common configurations. The WTRU 710 may send SidelinkUEInformation 732 to the gNB 730 showing interest in the sidelink transmission. The WTRU 710 may receive and transmit the RRCConnectionReconfiguration 733 for the sidelink communication dedicated configurations. The WTRU 710 may receive the dynamic resource allocation via DCI 3_0 734.

FIG. 7 illustrates example message exchanges between a WTRU and an eNB or gNB. In this example, the WTRU is moving from LTE coverage to NR coverage. Initially, the WTRU is camped on LTE eNB. The WTRU receives a SIB21 for LTE V2X sidelink communication common configurations, or it receives RRCConnectionReconfiguration for LTE V2X sidelink communication dedicated configurations. The WTRU sends sidelinkUEInformation to eNB, indicating that it is interested in performing LTE V2X sidelink transmissions and requests assignment of transmission resources. Based on the configuration, the WTRU is a mode 3 WTRU and receives the dynamic resource allocation via DCI 5A in LTE. Thereafter, the WTRU applies the allocated resources for its transmissions.

After some time, this WTRU moves out of LTE eNB coverage and into NR gNB coverage. The WTRU receives the SIB-V2X from gNB for NR V2X sidelink communication common configurations or receives the RRCConnectionReconfiguration for the NR V2X sidelink communication dedicated configurations. It sends sidelinkUEInformation to gNB, showing that it is interested in the LTE V2X sidelink transmissions and requests the assignment of transmission resources. The UE may receive the dynamic resource allocation via a DCI format in NR and decode it using the RNTI associated with LTE sidelink service, or it may receive the dynamic resource allocation via a unified DCI format with the "NR Indicator" field being 0. Then it applies the allocated resources to continue its LTE sidelink transmissions.

Figure 8:
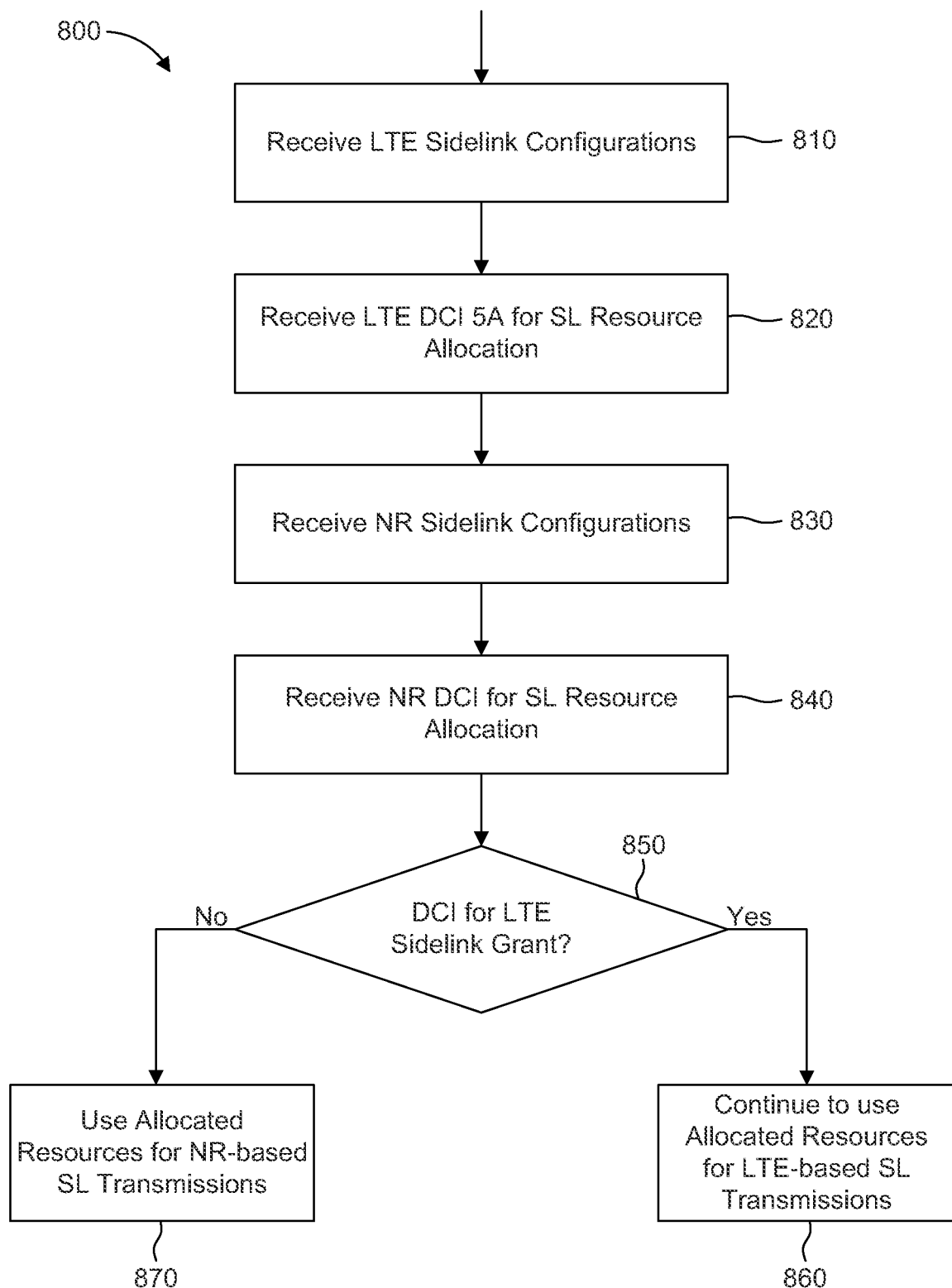
FIG. 8 is a flow chart which illustrates an example procedure for a WTRU to move from LTE eNB coverage to NR gNB coverage while maintaining LTE sidelink transmissions.

FIG. 8 is a flow chart which illustrates an example procedure 800 for a WTRU to move from LTE eNB coverage to NR gNB coverage while maintaining LTE sidelink transmissions. The WTRU may receive LTE sidelink configurations 810. The WTRU may then receive LTE DCI 5A for SL resource allocation 820. Then, the WTRU receives NR sidelink configurations 830. The WTRU then receives NR DCI for SL resource allocation 840. Then the WTRU determines whether the DCI is for LTE sidelink grant 850. If the DCI is for LTE sidelink grants, the WTRU continues to use allocated resources for LTE-based SL transmission 860, but if the WTRU is not for LTE sidelink grant, then the WTRU uses allocated resources for NR-based SL transmissions 870.

Some embodiments include NR Uu enhancement for unicast and group-cast sidelink. In an example mode 3 WTRU, a gNB allocates resources for the sidelink transmissions. In LTE, the sidelink transmissions are via broadcast, and no feedback from the receiving WTRU is needed. In NR, the sidelink transmissions may be unicast or groupcast. For example, two vehicles, traveling one in front and one behind, may communicate with each other. The front vehicle may send road conditions to the back vehicle. In this scenario, HARQ feedback from the back vehicle to the front vehicle may be needed.

Accordingly, it may be desired to support resource allocation for unicast and group-cast communications which need HARQ feedback from the receiving WTRU to enhance reliable transmissions.

In this example, if the front vehicle is a mode 3 WTRU, it may request resources needed for the unicast or group-cast sidelink transmissions from the gNB. In this resource allocation request, the transmitting WTRU may request not only the resources for the data transmissions, but also resources for the HARQ feedback from the back vehicle. To support this feature, a new NR DCI format may also need to reserve the HARQ-ACK resource, as well as the data transmission resource. Accordingly, in some examples, an additional item is added to the NR DCI format. This item may be referred to as "PSSCH-to-HARQ feedback timing" for example. This field may provide a time gap between data transmission (or the last data retransmission of the transport block if there are data retransmissions) and HARQ feedback. This field may contain 1, 2, or 3 bits, for example, to indicate up to a 2, 4 or 8 slot time gap respectively.

In addition to a time-domain resource reservation for the HARQ feedback, frequency domain resources should also be reserved for the HARQ feedback. Accordingly, an additional field may be introduced into the NR DCI format. This field may be referred to as "sub-channel allocation for HARQ" for example. In some examples, the same sub-channel as the initial transmission for the HARQ feedback. Then the "sub-channel allocation for HARQ" field could be one bit indication. In some examples, either the same sub-channel as the initial transmission or as the retransmission may be used for the HARQ feedback. In such cases, the "sub-channel allocation for HARQ" field may be a two-bit indication. In some examples, the sub-channel index of the HARQ feedback may be explicitly indicated. In such cases, the "sub-channel allocation for HARQ" field may be $\lceil \log_2 N_{subchannel}^{SL} \rceil$ bits in length. In some examples, another resource in another resource pool different from the PSSCH resource pool may be explicitly indicated.

If the transmitting WTRU sends the unicast or group-cast data with sidelink control information (SCI), the SCI could contain the timing gap information. This may be done to reserve the resources for the HARQ feedback transmissions. In other words, besides the field which may be referred to as a "time gap between initial transmission and retransmission" field in NR SCI, there may be an additional field, which may be referred to as a "time gap between last (re)transmission and feedback" in NR SCI. Similarly, the NR SCI could also contain frequency domain reservation information for the HARQ, in a similar scheme as for NR DCI. Here, the resource for HARQ feedback transmissions may not have to be of the same size as the resource for data transmissions. The resource for HARQ feedback transmissions may be in the same pool as the resource for data transmissions. The resource for HARQ feedback transmissions may be in a different pool as the resource for data transmissions.

The receiving WTRU may try to decode the unicast and group-cast data and send the HARQ on this reserved resource.

In an example mode 3 WTRU procedure for sending unicast or group-cast sidelink data, a transmit mode 3 WTRU first send a scheduling request to gNB. After the UL grant is received, the mode 3 WTRU sends a buffer status report (BSR) with an indication that the data is for unicast or group-cast. Based on the BSR, the gNB may assign resources for the WTRU to transmit unicast or group-cast sidelink transmissions. The transmit mode 3 WTRU then applies the first assigned resources for its sidelink data transmissions. After sending the sidelink data in the assigned resource pool, the transmit mode 3 WTRU may receive HARQ feedback in the assigned resources from the gNB.

Figure 9:
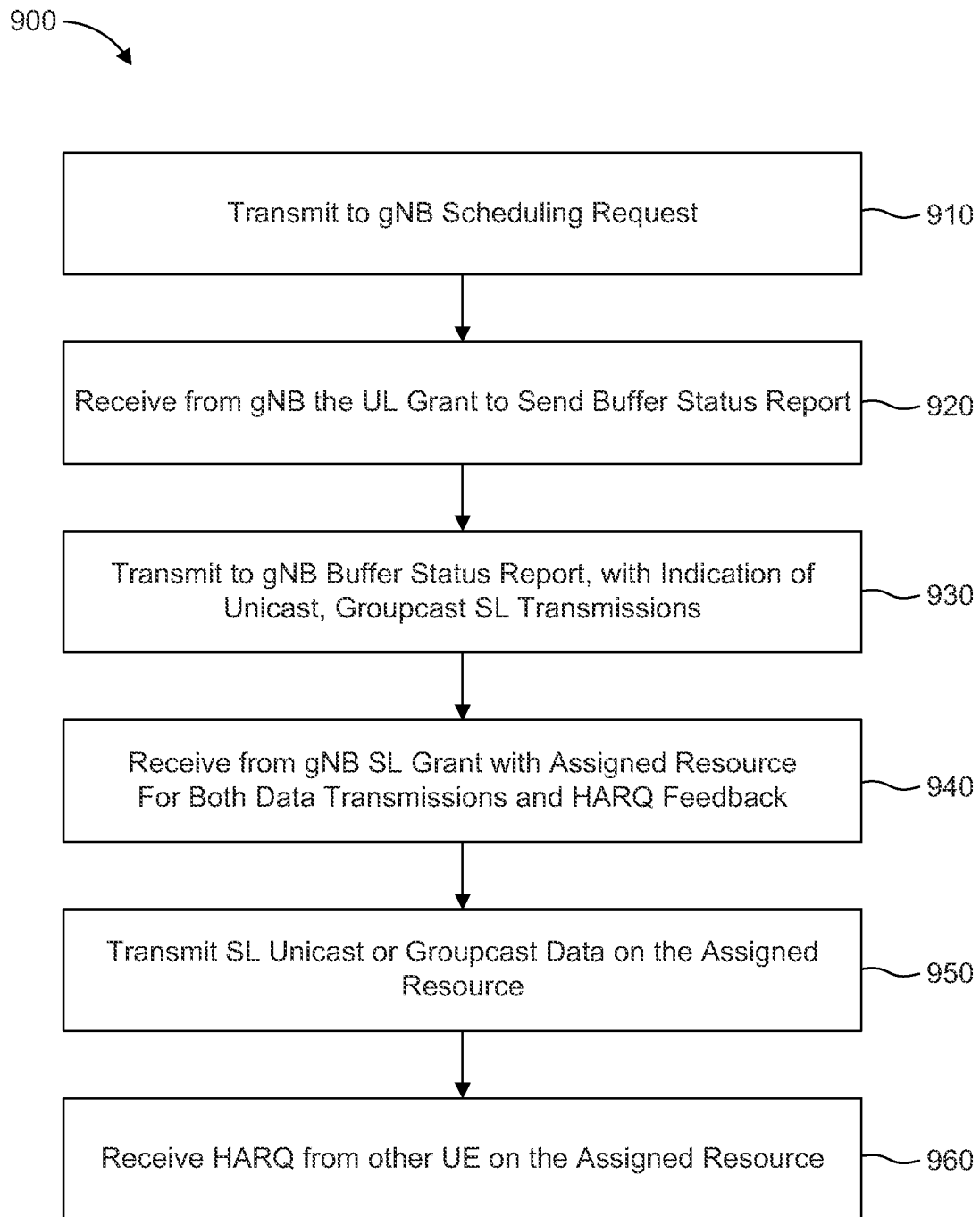
FIG. 9 is a flow chart illustrating an example procedure for sending unicast or group-cast sidelink data.

FIG. 9 is a flow chart illustrating an example procedure 900 for sending unicast or group-cast sidelink data. A transmit mode 3 WTRU may send a scheduling request to a gNB 910. The WTRU may then receive the UL grant from the gNB to send a buffer status report (BSR) 920. The WTRU may send the BSR to the gNB, with an indication that the data is for unicast or group-cast SL transmissions 930. The WTRU may then receive from the gNB an SL grant with assigned resource for both data transmissions and HARQ feedback 940. The WTRU may then transmit SL unicast or groupcast data on the assigned resource 950. The WTRU may thereafter receive HARQ from other WTRUs on the assigned resource 960.

Some embodiments include a configured grant for NR sidelink. In LTE V2X, up to 2 repetitions of the same transport block (TB) are supported for sidelink transmissions. For a mode 3 WTRU, the network may simultaneously assign the resources for 2 repetitions. In NR, up to 8 repetitions of the same TB are supported for uplink transmissions. Accordingly, it may be desired to support multiple numbers of repetitions of the same TB for sidelink grant-free configuration, e.g., using methods, procedures, and IE signaling described below.

In some examples, UL configured grant type 1 or type 2 schemes could be applied to sidelink transmissions. In some examples, type 1 grants are without layer 1 activation/deactivation, and type 2 are with layer 1 activation/deactivation. To support multiple repeated transmissions of the same TB in a sidelink configured grant, it may be desired to also configure the number of repetitions. In some examples, the number of repetitions may be associated with the configured grant. Further, the redundancy version (RV) may vary in different repetitions. Accordingly, it may be beneficial to configure the RV of the repetition in the sidelink configured grant. For example, a new IE, which may be referred to as BWP-SidelinkDedicated, may be defined as follows in Table 7. The sidelink grant type 1 or sidelink grant type 2 may be configured based on WTRU capabilities.

TABLE 7

```
BWP-Sidelink ::=            SEQUENCE {
   bwp-Dedicated            BWP-SidelinkDedicated
   ...
}
BWP-SidelinkDedicated ::=   SEQUENCE {
   configuredSidelinkGrantConfig  SetupRelease { ConfiguredSidelinkGrantConfig } ...
}
ConfiguredSidelinkGrantConfig ::=  SEQUENCE {
...
  repK
  repK-RV
  rrc-ConfiguredSidelinkGrant         SEQUENCE {
  ...
  }
}
```

Although the sidelink configured grant may configure the number of repetitions of the same TB, this number may be dynamically changed due to the number of resources available in the resource pool. The DCI format, which activates the sidelink configured grant type 2, may grant a different number of resources from the configured value. In this case, the WTRU may apply the dynamically indicated number of resources for the repetition. If the dynamically indicated number of resources matches the configured number of repetitions, the RV of the repetition may follow the configured pattern. If the dynamically indicated number of resources does not match the configured number of repetitions, the indicated number of resources may be the number of repetitions and the RV of the repetition may depend on WTRU's decision, or may follow a different pattern from the configured RV pattern.

FIG. 10 is a flow chart illustrating an example of such a WTRU procedure 1000 for determining the number of repetitions and its associated RV pattern in the sidelink configured grant type 2. The WTRU may receive the SL configured grant configuration 1010. The WTRU then receives the DCI to activate the SPS transmission, with a certain number of resources for SL data transmission 1020. It must then be determined whether the number of resources in DCI matches the configured number of repetitions 1030; if yes, then apply the configured number of repetitions with the associated RV pattern 1040, and if no, then apply the indicated number of repetitions with a different RV pattern 1050.

Some embodiments include handling of multiple MCS tables. In Release 14 LTE V2X, a single MCS table is used, limited to quadrature phase shift keying (QPSK) and 16 point quadrature amplitude modulation (16QAM). In Release 15 LTE V2X, the same MCS table is used without this limitation. The MCS entry based on the given MCS table may be configured in the IEs of SL-PSSCH-TxParameters, SL-CommConfig, SL-V2X-ConfigDedicated.

For NR URLLC use cases, there are two available MCS tables for cyclic prefix OFDM (CP-OFDM), i.e., MCS table 1 and MCS table 3. MCS table 1 has a relatively high spectral efficiency entries working mainly for the block error rate (BLER) target of $10^{-1}$, while MCS table 3 has a relatively low spectral efficiency entries working mainly for the BLER target of $10^{-5}$.

Since NR V2X includes a type of URLLC use cases having a lowest reliability requirement of $1-10^{-5}$, it is feasible to apply two MCS tables to V2X. Accordingly, in some examples the MCS table may be configured for NR V2X transmissions. For a mode 3 WTRU, both MCS table index and MCS entry index may be configured. The configuration may be for the IE of SL-V2X-ConfigDedicated as follows. An example implementation of SL-V2X-ConfigDedicated appears in Table 8. In the "scheduled" component, two fields could be added. Such fields may be referred to as "mcs-Table" field and "mcs-Entry" field. In some examples, the values for the mcs-Table field could be "lowSE" indicating the configured MCS table is MCS table 1; or could be "highSE" indicating the configured MCS table is MCS table 3. Any suitable naming is possible. In some examples, if these two fields are not configured, the selection of MCS table and MCS entry may be left to WTRU implementation. In some examples, configuring only the "mcs-Table" field while leaving "mcs-Entry" field not configured may be possible. In such cases, the WTRU is permitted, but not required, to select the MCS index within the configured MCS table.

TABLE 8

```
SL-V2X-ConfigDedicated ::=      SEQUENCE {
   commTxResources              CHOICE {
      release                   NULL,
      setup                     CHOICE {
         scheduled                  SEQUENCE {
         ......
            mcs-Table          ENUMERATED{lowSE, highSE}
            mcs-Entry
         },
   ......
}
```

The IE SL-PSSCH-TxParameters configures the minimum and maximum MCS values used for transmissions on PSSCH. These parameters may depend on the MCS tables. Accordingly, we may define maximum and minimum MCS values for each MCS table. For example, two values, which may be referred to as "minMCS-PSSCH-lowSE" and "maxMCS-PSSCH-lowSE" may be used to define minimum and maximum MCS values for MCS table 1, while two other values, which may be referred to as "minMCS-PSSCH-highSE" and "maxMCS-PSSCH-highSE" may be used to define minimum and maximum MCS values for MCS table 3. Table 9 shows an example SL-PSSCH-TxParameters IE:

TABLE 9

```
SL-PSSCH-TxParameters ::=        SEQUENCE {
        minMCS-PSSCH-lowSE       INTEGER (0..31),
        maxMCS-PSSCH-lowSE       INTEGER (0..31),
        minMCS-PSSCH-highSE      INTEGER (0..31),
        maxMCS-PSSCH-highSE      INTEGER (0..31),
        ......
}
```

The discussions above relate to the CP-OFDM waveform. It is noted that the same approaches may also be applied to the DFT-S-OFDM waveform.

MCS table selection and MCS index selection may be dynamically indicated. In some examples, the MCS table selection and MCS index selection may be indicated to the receiving WTRU via explicit SCI contents from the transmitting WTRU. In some examples, the SCI may include a new field, which may include a single bit. This field may be referred to as "MCS table selection." If this field is 0 (for example), then the MCS table 1 is selected. Otherwise, the MCS table 3 is selected. Another way to distinguish the MCS table selection is to use different RNTI's to scramble CRC of the SCI. In some examples, if a new RNTI is used to scramble CRC of the SCI, then MCS table 3 is used. Otherwise, the MCS table 1 is used.

In some examples, the MCS table selection can be indicated in association with (e.g., by) the PSCCH resource locations. In some examples, the starting sub-channel index of the PSCCH/PSSCH may be used to distinguish the MCS table selection. For example, if the starting sub-channel index is below a certain number (e.g., 10) then the MCS table 1 is used. Otherwise, the MCS table 3 is used.

In some examples, MCS table selection can be indicated in association with (e.g., by) the communication resource pools. In some examples, each communication resource pool may support only a single MCS table. In some examples, the WTRU may automatically switch the MCS table by switching its communication resource pool.

In some examples, the MCS table selection is liked with the data PPPR value. In some examples, the data PPPR value may be introduced in SCI. For example, for data with requirements for greater reliability (e.g., PPPR is less than a threshold), the MCS table containing low spectrum efficiency entries (e.g., MCS table 3) will be used. Otherwise, the other MCS table (e.g., MCS table 1) will be used.

In some examples, the MCS table selection can be distinguished by applying the RNTI to only some of the CRC bits for SCI. For example, the RNTI may be 16 bits and the CRC may be 24 bits. Note that it is possible that the first 7 CRC bits may be distributed for early termination of the SCI decoding. Accordingly, the last 17 CRC bits are always appended. For example, if MCS table 1 is selected, then the RNTI is used to mask the last 16 CRC bits. If MCS table 3 is selected, then the RNTI is used to mask the second last CRC bit to the $17^{th}$ last CRC bit.

Figure 11:
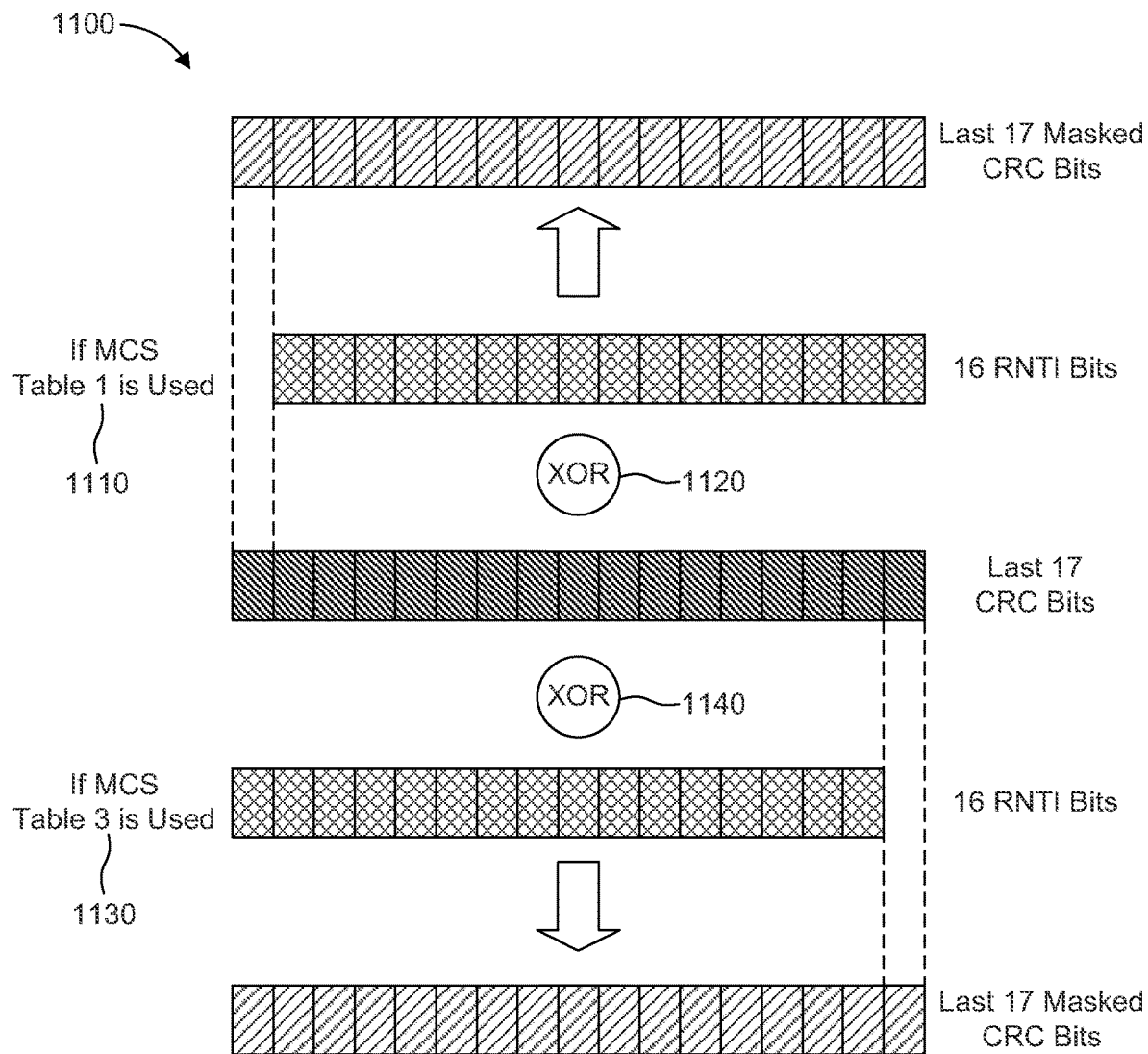
FIG. 11 is a bitmap illustrating an example CRC mask with RNTI on different CRC bits to indicate which MCS table is used.

FIG. 11 is a bitmap 1100 illustrating an example CRC mask with RNTI on different CRC bits to indicate which MCS table is used. If there are more than 17 CRC bits not distributed or appended, then the parts of the appended CRC bits to be masked with RNTI could have different choices to indicate the used MCS table. The techniques discussed above may be extended to distinguish more than 2 MCS tables, e.g., if more than 2 MCS tables are allowed to be used for V2X communication.

More specifically, if the MCS table 1 1110 is used, the RNTI may be used to mask the last 16 CRC bits 1120. If instead the MCS table 3 1130 is used, the RNTI may be used to mask the $2^{nd}$ last CRC bit to the $17^{th}$ last CRC bit 1140.

Figure 12:
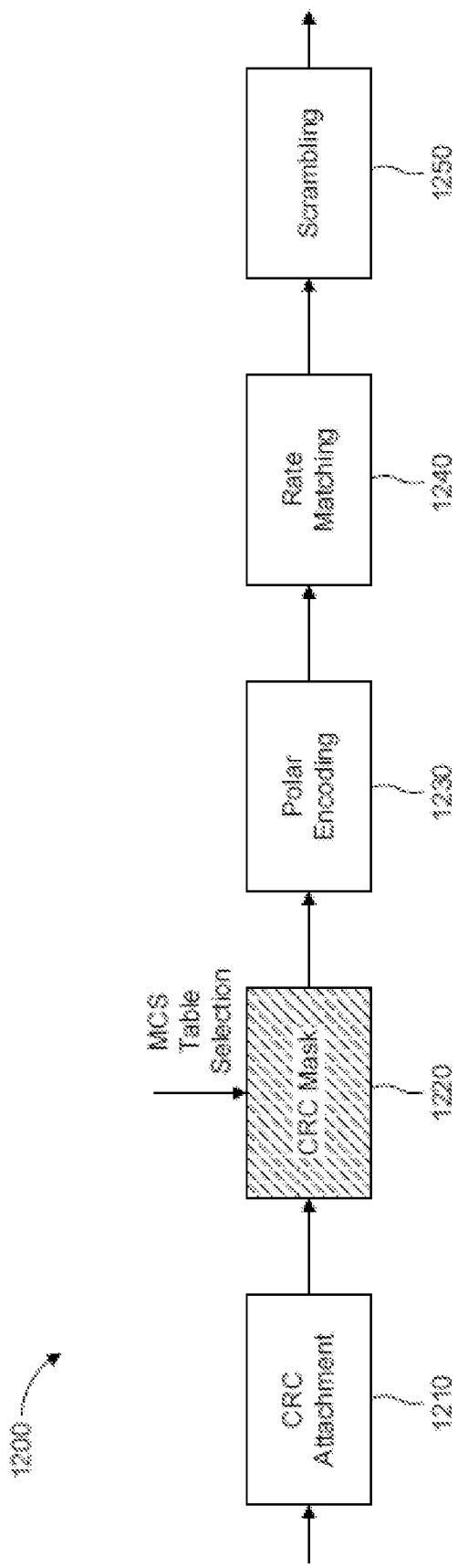
FIG. 12 is a flow chart illustrating an example of an overall SCI procedure.

FIG. 12 is a flow chart illustrating an example of the overall SCI procedure 1200, of which the CRC mask operations illustrated with respect to FIG. 11 may be a part. The procedure begins first with CRC attachment 1210. Then the MCS table may be selected, and CRC masking may occur 1220. This is followed by polar encoding 1230, then rate matching 1240, and finally scrambling 1250.

Some embodiments include establishing group-cast or unicast sidelink. In LTE V2X, the sidelink is only broadcast. Group-cast or unicast sidelink may be supported in NR V2X. Various methods, devices, and systems may be implemented to support establishment of group or direct (one-to-one) communication. In some examples, the case of unicast sidelink communication may be conceptualized as a group-cast sidelink communication with group size being 2.

An example use scenario for group-cast or unicast sidelink can be referred to as vehicle platooning. All the vehicles in a platoon may seek to have group based communication. Further, any particular vehicle in a platoon may want to communicate with the platoon leader (e.g., the vehicle in the front of the platoon).

Figure 13:
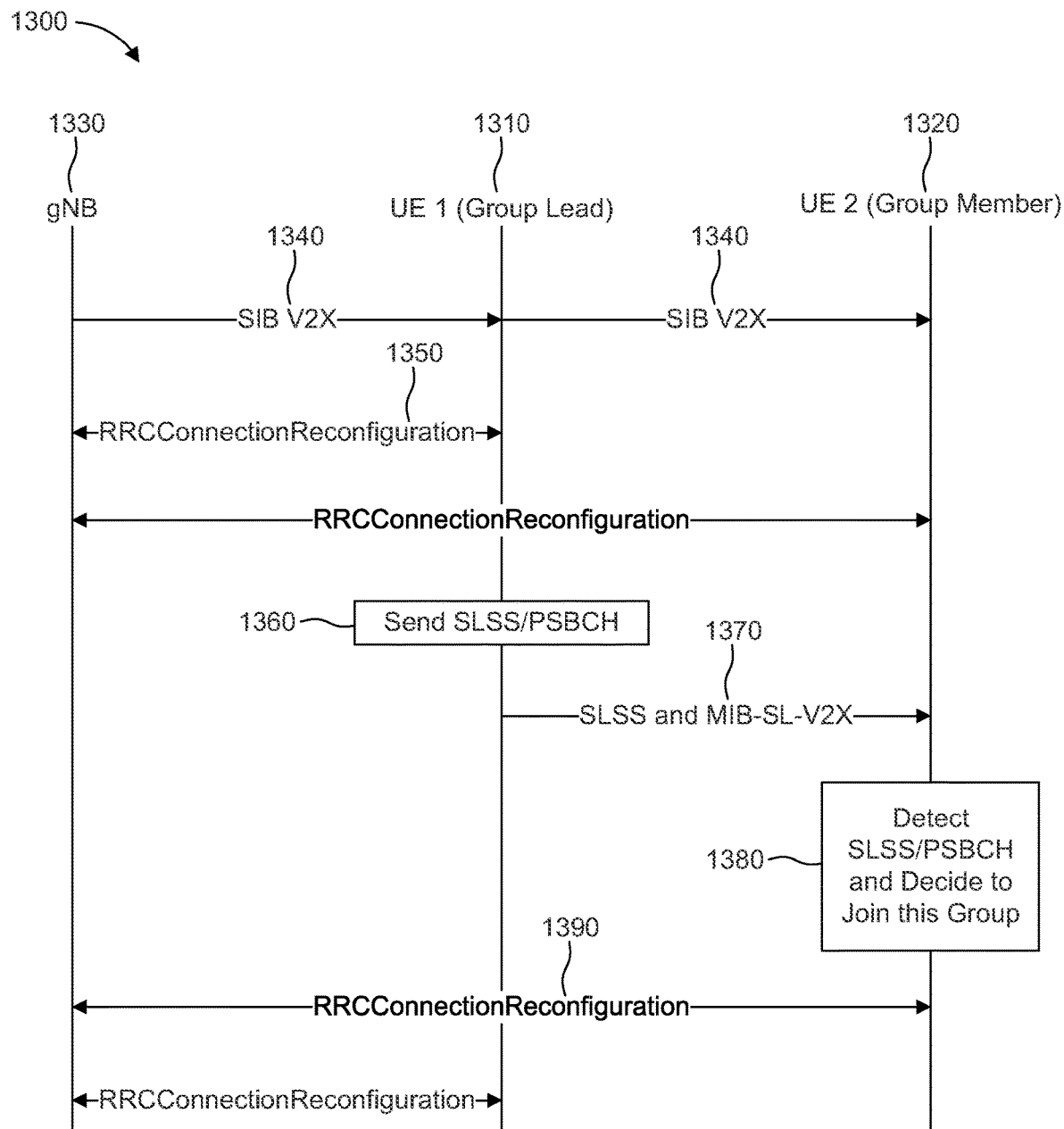
FIG. 13 is a message sequence chart illustrating an example flow for establishing a communication group.

The group for sidelink may be established with the help of (e.g., may be coordinated by) gNB. This may be achieved by modifying the Uu link, as well as the sidelink. FIG. 13 is a message sequence chart illustrating an example flow for establishing a communication group.

FIG. 13 illustrates an exemplary flow diagram 1300 for establishing a sidelink communication group. In this example, WTRU 1 1310 and WTRU 2 1320 may be within the coverage of the gNB 1330. WTRU 1 1310 and WTRU 2 1320 may receive system information SIB V2X 1340 from the gNB 1330. Thereafter, WTRU 1 may exchange a RRC-ConnectionReconfiguration 1350 (a) message with the gNB 1330. In this message exchange, WTRU 1 1310 may register to transmit Sidelink Synchronization Signal/Physical Sidelink Broadcast Channel (SLSS/PSBCH) 1360 and to be a group head. WTRU 2 1320 may receive the SLSS and MIB-SL-V2X 1370. WTRU 2 1320 may be interested in joining the group communication 1380 with WTRU 1 1310. WTRU 2 1320 does this by exchanging RRCConnection-Reconfiguration 1390 with the gNB 1330.

In the example of FIG. 13, a first WTRU (UE 1) and a second WTRU (UE 2) are within the coverage of the gNB. UE1 and UE2 receive system information SIB V2X from gNB. Thereafter, UE 1 exchanges a RRCConnectionReconfiguration message with gNB. In this message exchange, UE 1 registers to transmit Sidelink Synchronization Signal/Physical Sidelink Broadcast Channel (SLSS/PSBCH) and also registers to be a group head.

In some examples, RRCConnectionReconfiguration includes SL-V2X-ConfigDedicated, IE, which may include a group control field which may include fields for "message-type," "SLSS-ID," "group-ID," "group-head," and "group-members." Since UE 1 is the group head and registers for a new group, the "message-type" could be of value "create." The "SLSS-ID" indicates an SLSS-ID to be used by UE 1 for its broadcast SLSS/PSBCH message. This value may be derived from the configuration. The "group ID" could be assigned by gNB. The "group-head" could be some identity of UE 1. At this stage, the "group-members" field could be empty as there are no other members in the group. Table 10 lists an example of SL-V2X-ConfigDedicated:

TABLE 10

```
SL-V2X-ConfigDedicated ::=                SEQUENCE    {
    group-control      SEQUENCE {
        message-type       ENUMERATED {create, join, leave, remove}
        SLSS-ID
        group-ID
        group-head
        group-members
    }
    ...
}
```

UE 2 may receive the SLSS and MIB-SL-V2X from UE 1. UE2 may be interested in joining the group communication with UE 1. Accordingly, UE2 exchanges a RRCConnectionRecofiguration message with the gNB. In the IE SL-V2X-ConfigDedicated, the gNB may set "message-type=join," and the SLSS ID as the detected SLSS ID from UE 1. The gNB may send the IE SL-V2X-ConfigDedicated to UE 2, with the associated group ID, group head and group members information to UE 2. gNB may also update the group information with the group head (i.e., UE 1).

If UE 2 wants to leave the group, it may send the IE SL-V2X-ConfigDedicated to gNB with "message-type=leave" and the proper SLSS ID. gNB may confirm and update the group information with the group head UE 1.

If UE1 wants to remove the group, it may send the IE SL-V2X-ConfigDedicated to gNB with "message-type=remove" and the proper SLSS ID. gNB may confirm and update the group information with all the group members.

In the example scheme above, the group ID is exchanged between individual WTRUs and gNB. A group member WTRU may find the proper group by providing the SLSS ID to gNB. Alternatively, the group ID information may be directly sent out in SLSS/PBSCH. For example, the MIB-SL-V2X sent by UE 1 may contain a "group-ID" field. This ID may be used for other UEs to establish the group communication with the UE sending the SLSS and MIB-SL-V2X. Table 11 illustrates the example group-ID field:

TABLE 11

```
    MasterInformationBlock-SL-V2X::=        SEQUENCE {
    ......
    Group-ID
    }
```

In this scheme, the "SLSS ID" field in the IE SL-V2X-ConfigDedicated may be ignored. UE 2 may directly inform gNB about the group ID it wants to join to leave. Although e introduce the group-control parameters are described with respect to the SL-V2X-ConfigDedicated IE for the sake of example, it is not restricted to this IE.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider New Radio (NR), 5G or LTE, LTE-A specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method performed by a wireless transmit receive unit (WTRU) configured to perform sidelink (SL) communications using Long Term Evolution (LTE) and New Radio (NR) technologies, the method comprising:
    receiving a downlink control information (DCI) on a physical downlink control channel (PDCCH) transmission from a base station, wherein the DCI is associated with a cyclic redundancy check (CRC) that is scrambled using a radio network temporary identifier (RNTI), wherein the DCI indicates resources for a LTE sidelink transmission when the CRC is scrambled using a first RNTI, and the DCI indicates resources for an NR sidelink transmission when the CRC is scrambled using a second RNTI; and
    transmitting SL data using the resources indicated by the DCI.

2. The method of claim 1, wherein the DCI includes a sidelink transmission grant for both data transmissions and HARQ feedback transmissions.

3. The method of claim 1, wherein the second RNTI is a sidelink V2X RNTI (SL-V-RNTI).

4. The method of claim 1, wherein the second RNTI is a sidelink semi persistent (SL-SPS) V2X RNTI (SPS-SL-RNTI).

5. The method of claim 1, wherein the DCI has either a first format or a second format based on whether the CRC is scrambled using the first RNTI or the second RNTI.

6. The method of claim 5, wherein the first format and the second format have a same payload size.

7. A wireless transmit receive unit (WTRU) configured to perform sidelink (SL) communications using Long Term Evolution (LTE) and New Radio (NR) technologies, the WTRU comprising:
    a receiver configured to receive a downlink control information (DCI) on a physical downlink control channel (PDCCH) transmission from a base station, wherein the DCI is associated with a cyclic redundancy check (CRC) that is scrambled using a radio network temporary identifier (RNTI), wherein the DCI indicates resources for a LTE sidelink transmission when the CRC is scrambled using a first RNTI, and the DCI indicates resources for an NR sidelink when the CRC is scrambled using a second RNTI; and a transmitter configured to transmit sidelink data on the resources indicated by the DCI.

8. The WTRU of claim 7, wherein the DCI includes a sidelink transmission grant for both data transmissions and HARQ feedback transmissions.

9. The WTRU of claim 7, wherein the second RNTI is a sidelink V2X RNTI (SL-V-RNTI).

10. The method of claim 1, wherein the second RNTI is a sidelink semi persistent (SL-SPS) V2X RNTI (SPS-SL-RNTI).

11. The WTRU of claim 7, wherein the DCI has either a first format or a second format based on whether the CRC is scrambled using the first RNTI or the second RNTI.

12. The WTRU of claim 9, wherein the first format and the second format have a same payload size.

* * * * *